US012380615B2

(12) United States Patent
Hinds et al.

(10) Patent No.: US 12,380,615 B2
(45) Date of Patent: Aug. 5, 2025

(54) SCENE GRAPH TRANSLATION

(71) Applicant: Tencent America LLC, Palo Alto, CA (US)

(72) Inventors: Arianne Hinds, Palo Alto, CA (US); Paul Spencer Dawkins, Garland, TX (US); Stephan Wenger, Hillsborough, CA (US)

(73) Assignee: TENCENT AMERICA LLC, Palo Alto, CA (US)

( * ) Notice: Subject to any disclaimer, the term of this patent is extended or adjusted under 35 U.S.C. 154(b) by 229 days.

(21) Appl. No.: 18/215,343

(22) Filed: Jun. 28, 2023

(65) Prior Publication Data

US 2024/0104803 A1    Mar. 28, 2024

Related U.S. Application Data

(60) Provisional application No. 63/429,062, filed on Nov. 30, 2022, provisional application No. 63/428,030, filed on Nov. 25, 2022, provisional application No. 63/427,429, filed on Nov. 22, 2022, provisional application No. 63/410,516, filed on Sep. 27, 2022.

(51) Int. Cl.
*G06T 11/20* (2006.01)

(52) U.S. Cl.
CPC ........ *G06T 11/206* (2013.01); *G06T 2210/32* (2013.01)

(58) Field of Classification Search
CPC .......................... G06T 11/206; G06T 2210/32
See application file for complete search history.

(56) References Cited

U.S. PATENT DOCUMENTS

| 2003/0001877 | A1* | 1/2003 | Duquesnois ... | H04N 21/234318 |
| | | | | 375/E7.005 |
| 2014/0368522 | A1* | 12/2014 | Arbree ...................... | G06T 1/60 |
| | | | | 345/555 |
| 2018/0189243 | A1* | 7/2018 | Allyn .................... | G06F 16/958 |

* cited by examiner

*Primary Examiner* — Xin Sheng
(74) *Attorney, Agent, or Firm* — ARENTFOX SCHIFF LLP

(57) ABSTRACT

Media data of a first scene graph is received. The first scene graph is created based on a first scene graph format. The first scene graph format includes a plurality of description components indicating attributes of the first scene graph. A plurality of metadata identifiers associated with the first scene graph format and a plurality of metadata identifiers associated with a second scene graph format are determined based on a lookup table. The lookup table identifies metadata identifiers associated with the first and second scene graph formats. A plurality of description components of the second scene graph format that indicates the attributes of the first scene graph is determined based on (i) the plurality of description components of the first scene graph format, (ii) the plurality of metadata identifiers associated with the first scene graph format, and (iii) the plurality of metadata identifiers associated with the second scene graph format.

20 Claims, 25 Drawing Sheets

```xml
<OCS2 version='11000200'>
  <graph id='1' type='1' name='Vent shaft'>
    <graph id='2' type='1' name='Vent shaft' position='0 0'>
      <attr name='color' type='8'>1 1 1</attr>
      <node id='3' type='16' name='Vent shaft' position='0 -50'
        pluginData='<GuiBox=290.500 876.500 130.000
        307.900 0 60 1 1  130 0>'>
        <pin name='diffuse'>
          <node id='4' type='33'>
            <attr name='value' type='8' > 0 0 0</attr>
          </node>
        </pin>
        <pin name='specular'>
          <node id='5' type='31'>
            <attr name='value' type='6'>1</attr>
          </node>
        </pin>
        <pin name='brdf'>
          <node id='6' type='57'>
            <attr name='value' type='2'>2</attr>
          </node>
        </pin>
        <pin name='roughness'>
          <node id='7' type='31'>
            <attr name='value' type='6'>0</attr>
          </node>
        </pin>
        <pin name='anisotropy'>
          <node id='8' type='6'>
            <attr name='value' type='8'>0 0 0</attr>
          </node>
        </pin>
        <pin name='spread'>
          <node id='9' type='6'>
            <attr name='value' type='8' > 0.5 0 0</attr>
          </node>
        </pin>
        <pin name='filmwidth'>
          <node id='10' type='31'>
            <attr name='value' type='6'>0</attr>
          </node>
        </pin>
        <pin name='filmindex'>
          <node id='11' type='6'>
            <attr name='value' type='8'>1.45 0 0.</attr>
          </node>
        </pin>
      </node>
    </graph>
  </graph>
</OCS2>
```

ITMF OCS example 2001 of human-readable scene graph description

Mapping 2003 of id's from ITMF OCS to IMS metadata 2002

Scene graph id = '1'  <-> IMS_ID_2002A
Scene graph id = '2'  <-> IMS_ID_2002B
Scene graph id = '3'  <-> IMS_ID_2002C
Scene graph id = '4'  <-> IMS_ID_2002D
Scene graph id = '5'  <-> IMS_ID_2002E
Scene graph id = '6'  <-> IMS_ID_2002F
Scene graph id = '7'  <-> IMS_ID_2002G
Scene graph id = '8'  <-> IMS_ID_2002H
Scene graph id = '9'  <-> IMS_ID_2002I
Scene graph id = '10' <-> IMS_ID_2002J
Scene graph id = '11' <-> IMS_ID_2002K
Scene graph id = '12' <-> IMS_ID_2002L

SCENE GRAPH TRANSLATION

INCORPORATION BY REFERENCE

This present application claims the benefit of priority to U.S. Provisional Application No. 63/410,516, "LOOKUP TABLES FOR SCENE GRAPH TRANSLATION" filed on Sep. 27, 2022, U.S. Provisional Application No. 63/427,429, "ANNOTATION OF ITMF SCENE GRAPH WITH METADATA FOR SCENE GRAPH TRANSLATION" filed on Nov. 22, 2022, U.S. Provisional Application No. 63/428,030, "ANNOTATION OF glTG2.0 SCENE GRAPH WITH INLINE METADATA FOR SCENE GRAPH TRANSLATION" filed on Nov. 25, 2022, and U.S. Provisional Application No. 63/429,062, "ANNOTATION OF glTG2.0 SCENE GRAPH WITH BINARY METADATA FOR SCENE GRAPH TRANSLATION" filed on Nov. 30, 2022. The entire disclosures of the prior applications are hereby incorporated by reference.

TECHNICAL FIELD

The present disclosure describes embodiments generally related to media processing and distribution.

BACKGROUND

The background description provided herein is for the purpose of generally presenting the context of the disclosure. Work of the presently named inventors, to the extent the work is described in this background section, as well as aspects of the description that may not otherwise qualify as prior art at the time of filing, are neither expressly nor impliedly admitted as prior art against the present disclosure.

Immersive media-capable presentation devices include devices equipped to access, interpret, and present immersive media. Such devices can be heterogeneous in terms of capabilities and the media that may be supported by the devices. A scene graph may be used to present certain immersive media, such as scene-based immersive media. However, the scene graph of a specific data format may not be supported by all of the immersive media-capable presentation devices.

SUMMARY

Aspects of the disclosure provide methods and apparatuses (electronic devices) for media processing.

According to an aspect of the disclosure, a method of media processing in an electronic device is provided. In the method, media data that includes a plurality of scene graphs is received. The plurality of scene graphs includes a first scene graph that is created based on a first scene graph format of a plurality of scene graph formats. The plurality of scene graph formats comprises attributes of the plurality of scene graphs. The first scene graph format includes a plurality of description components that indicates attributes of the first scene graph. A plurality of metadata identifiers associated with the first scene graph format and a plurality of metadata identifiers associated with a second scene graph format of the plurality of scene graph formats are determined based on an independent mapping space (IMS) lookup table, where the IMS lookup table identifies metadata identifiers associated with each of the plurality of scene graph formats. A plurality of description components of the second scene graph format that indicates the attributes of the first scene graph is determined based on (i) the plurality of description components of the first scene graph format, (ii) the plurality of metadata identifiers associated with the first scene graph format, and (iii) the plurality of metadata identifiers associated with the second scene graph format. The first scene graph is rendered based on the plurality of description components of the second scene graph format.

In some embodiments, the attributes of the first scene graph include at least one of a logical attribute, a physical attribute, a temporal attribute, or a spatial attribute.

In some embodiments, each of the plurality of description components of the first scene graph format indicates a respective one of the attributes of the first scene graph.

In an example, each of the plurality of description components of the first scene graph format is associated with one or more metadata identifiers of the plurality of metadata identifiers that are associated with the first scene graph format. In an example, each of the plurality of description components of the second scene graph format is associated with one or more metadata identifiers of the plurality of metadata identifiers that are associated with the second scene graph format.

In an example, the first scene graph format is one of a Graphics Language Transmission Format (glTF), a glTF prime, an Immersive Technologies Media Format (ITMF), a Universal Scene Description, and a first renderer. In an example, the second scene graph format is one of the glTF, the glTF prime, the ITMF, the Universal Scene Description, and a second renderer, where the second scene graph format is different from the first scene graph format.

In an example, the plurality of metadata identifiers associated with the first format is specified in ISO/IEC 28090 Part 28.

In some embodiments, the first scene graph includes a plurality of binary assets, each of the plurality of binary assets indicating a respective element of an object included in the first scene graph.

In an example, the attributes of each of the plurality of binary assets of the first scene graph are indicated by the plurality of description components of the first scene graph format.

In some embodiment, a first description component and a second description component of the plurality of description components of the first scene graph format are associated with a same metadata identifier of the plurality of metadata identifiers associated with the first scene graph format.

In some embodiments, the attributes of each of the plurality of binary assets of the first scene graph are indicated by the plurality of description components of the second scene graph format.

According to another aspect of the disclosure, a method of media processing in an electronic device is provided. In the method, media data that includes a plurality of scene graphs is received. The plurality of scene graphs includes a first scene graph that is created based on a first format of a plurality of formats. The first format includes a plurality of scene graph identifiers that indicate attributes of the first scene graph. A plurality of metadata identifiers associated with the plurality of scene graph identifiers of the first format is determined. Each of the plurality of scene graph identifiers is associated with a respective one of the plurality of metadata identifiers. A second format associated with the first scene graph is determined based on the plurality of metadata identifiers. The second format includes a plurality of description components that indicates the attributes of the first scene graph. The first scene graph is rendered based on the plurality of description components of the second format.

In an example, the plurality of metadata identifiers associated with the first format is specified in ISO/IEC 28090 Part 28.

In some embodiments, the first format is an Immersive Technologies Media Format (ITMF).

In an example, the attributes of the first scene graph include at least one of a logical attribute, a physical attribute, a temporal attribute, or a spatial attribute.

In an example, each of the plurality of metadata identifiers associated with the first format indicates a respective one of the attributes of the first scene graph.

In an example, the first scene graph includes a plurality of binary assets, each of the plurality of binary assets indicating a respective element of an object included in the first scene graph.

In some embodiments, the attributes of each of the plurality of binary assets of the first scene graph are indicated by the plurality of scene graph identifiers of the first format.

In some embodiments, the attributes of each of the plurality of binary assets of the first scene graph are indicated by the plurality of description components of the second format.

In an example, the second format includes one of a Graphics Language Transmission Format (glTF), an glTF prime, and a Universal Scene Description.

In an example, each of the plurality of scene graph identifiers of the first format is a respective integer.

According to yet another aspect of the disclosure, a method of media processing in an electronic device is provided. In the method, media data that includes a plurality of scene graphs is received. The plurality of scene graphs includes a first scene graph that is created based on a first format of a plurality of formats. The first format includes a plurality of syntax elements that indicate attributes of the first scene graph. One or more independent mapping space (IMS) metadata are obtained from the plurality of syntax elements of the first format. The one or more IMS metadata are included in the plurality of syntax elements and indicates common attributes of the plurality of formats. A second format associated with the first scene graph is determined based on the obtained one or more IMS metadata. The second format includes a plurality of description components that indicates the attributes of the first scene graph. The first scene graph is rendered based on the plurality of description components of the second format.

In some embodiments, the one or more IMS metadata are specified in ISO/IEC 28090 Part 28.

In an example, the first format is a Graphics Language Transmission Format (glTF).

In an example, the one or more IMS metadata are included in the plurality of syntax elements of the first format and identified based on a prefix of an extension feature of the first format.

In some embodiments, the attributes of the first scene graph include at least one of a logical attribute, a physical attribute, a temporal attribute, or a spatial attribute.

In some embodiments, the first scene graph includes a plurality of binary assets, where each of the plurality of binary assets indicates a respective element of an object included in the first scene graph.

In an example, the first scene graph includes one or more binary metadata.

In an example, each of the one or more IMS metadata includes a respective metadata identifier associated with one of the common attributes of the plurality of formats. Each of the metadata identifiers of the one or more IMS metadata is an integer and corresponds to a respective binary metadata of the one or more binary metadata.

In some embodiment, the attributes of each of the plurality of binary assets of the first scene graph are indicated by the plurality of syntax elements of the first format.

In some embodiments, the attributes of each of the plurality of binary assets of the first scene graph are indicated by the plurality of description components of the second format.

In an example, the second format includes one of an Immersive Technologies Media Format (ITMF) and a Universal Scene Description.

According to another aspect of the disclosure, an apparatus is provided. The apparatus includes processing circuitry. The processing circuitry can be configured to perform any of the described methods for media processing.

Aspects of the disclosure also provide a non-transitory computer-readable medium storing instructions which when executed by a computer cause the computer to perform the method for media processing.

BRIEF DESCRIPTION OF THE DRAWINGS

Further features, the nature, and various advantages of the disclosed subject matter will be more apparent from the following detailed description and the accompanying drawings in which:

FIG. 20 is a schematic illustration of an example of mapping ITMF to IMS metadata according to some embodiments of the disclosure.

DETAILED DESCRIPTION OF EMBODIMENTS

Figure 1:
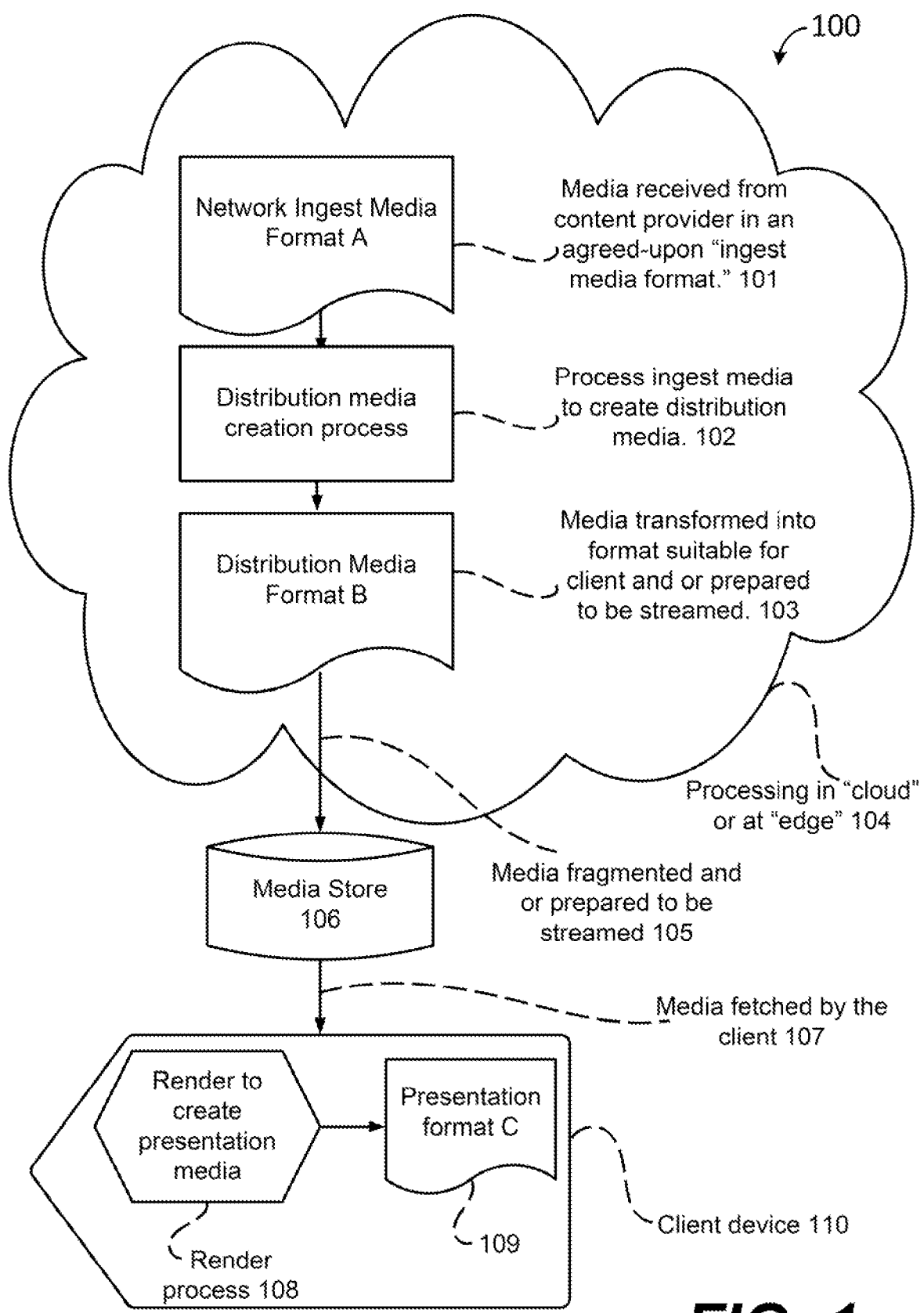
FIG. 1 shows a media flow process in some examples.

Aspects of the disclosure provide architectures, structures, components, techniques, systems and/or networks to distribute media, including video, audio, geometric (3D) objects, haptics, associated metadata, or other content for a client device. In some examples, architectures, structures, components, techniques, systems and/or networks are configured for distribution of media content to heterogenous immersive and interactive client devices, e.g., game engines.

Immersive media generally refers to media that stimulates any or all human sensory systems (e.g., visual, auditory, somatosensory, olfactory, and possibly gustatory) to create or enhance the perception of the user being physically present in the experience of the media, such as beyond what is distributed over existing commercial networks for a timed two-dimensional (2D) video and a corresponding audio which is known as "legacy media".

In some examples, immersive media refers to media that attempt to create, or imitate the physical world through digital simulation of kinetics and laws of physics, thereby stimulating any or all human sensory systems so as to create the perception by the user of being physically present inside a scene that depicts a real or virtual world.

Immersive media-capable presentation devices include devices equipped with sufficient resources and capabilities to access, interpret, and present immersive media. Such devices can be heterogeneous in terms of the quantities and formats of the media that may be supported by the devices. For example, media are heterogenous based on the amount and types of network resources being required to distribute the media at scale. "At scale" may refer to the distribution of the media by service providers being equivalent to distribution of legacy video and audio media over networks, e.g., Netflix, Hulu, Comcast subscriptions, and Spectrum subscriptions.

In contrast, legacy presentation devices such as laptop displays, televisions, and mobile handset displays are homogenous in their capabilities because these devices currently include rectangular display screens that consume frame-based 2D rectangular video or still images as their primary visual media formats. Some of the frame-based visual media formats commonly used in legacy presentation devices may include High Efficiency Video Coding/H.265, Advanced Video Coding/H.264, and Versatile Video Coding/H.266, for video media.

A term "frame-based" media can refer to a characteristic that visual media include one or more consecutive rectangular frames of imagery. In contrast, "scene-based" media (e.g., scene based immersive media) can refer to visual media that are organized by "scenes" in which each scene refers to individual assets that collectively describe the visual scene in some examples.

A comparative example between frame-based and scene-based visual media can be described using visual media illustrating a forest. In the frame-based representation, the forest is captured using camera devices, such as mobile phones with cameras. A user can enable a camera device to focus on the forest and the frame-based media that is captured by the camera device is the same as what the user sees through the camera viewport provided on the camera device, including any movement of the camera device initiated by the user. The resulting frame-based representation of the forest is a series of 2D images that are recorded by the camera device usually at a standard rate of 30 frames-per-second or 60 frames-per-second. Each image is a collection of pixels where information stored in each pixel is congruent, one pixel to the next.

In contrast, a scene-based representation of a forest includes individual assets that describe each of the objects in the forest. For example, the scene-based representation can include individual objects called "trees" where each tree is comprised of a collection of smaller assets called "trunks," "branches," and "leaves." Each tree trunk can be further described individually by a mesh (tree trunk mesh) that describes a full 3D geometry of the tree trunk and a texture that is applied to the tree trunk mesh to capture the color and radiance properties of the tree trunk. Furthermore, the tree trunk may be accompanied by additional information that describes the surface of the tree trunk in terms of its smoothness or roughness or ability to reflect light. The corresponding human-readable scene graph description may provide information as to where to place the tree trunks relative to the viewport of a virtual camera that is focused into the forest scene. Furthermore, the human-readable description may include information as to how many branches to generate and where to place the branches into the scene from a single branch asset called "branch." The human-readable description may include how many leaves to generate and the position of the leaves relative to the branches and the tree trunks. Moreover, a transformation matrix may provide information as to how to scale or rotate the leaves so that the leaves do not appear homogenous. Overall, the individual assets that comprise the scene vary in terms of the type and quantities of information that is stored in each asset. Each asset is usually stored in its own file, but often the assets are used to create multiple instances of the objects according to the design, such as the branches and leaves for each tree.

The human-readable portion of a scene graph may be rich in metadata because the human-readable portion of the scene graph not only describes the relationships of assets to their position within the scene, but also instructions how to render the object. For example, the object can be rendered based on various types of light sources, or different surface properties (to indicate the object has a metallic vs. matte surface), or a variety of materials (porous or smooth texture). Other information often stored in the human readable portion of the scene graph can be relationship between assets and other assets. For example, the assets can be rendered as groups or handled as a single entity, such as tree trunks with branches and leaves.

Examples of scene graphs with human readable components include glTF 2.0 where a node-tree component is provided in Java Script Object Notation (JSON) that is a human-readable notation to describe objects. Another example of a scene graph with a human readable component is an Immersive Technologies Media Format (ITMF) in which an OCS file is generated using XML, and XML can be another human-readable notation format.

Yet another difference between the scene-based media and the frame-based media is that in the frame-based media, the view that is created for the scene is identical to the view that is captured by the user via the camera, such as at the time when the media was created. When the frame-based media is presented by a client (or client device), the view of the media that is presented is the same as the view that is captured in the media, such as by the camera that was used to record the video. For the scene-based media, however, multiple ways can be applied for the user to view the scene using a variety of virtual cameras, such as a thin-lens camera or a panoramic camera.

In some examples, the distribution of media over networks can employ media delivery systems and architectures that reformat the media from an input or network "ingest" media format to a distribution media format. In an example, the distribution media format is not only suitable to be ingested by the target client device (or target client) and applications of the target client device, but also conducive to being "streamed" over the network. In some examples, two processes can be performed upon the ingested media by a network: 1) converting the media from a format A into a format B that is suitable to be ingested by the target client device, such as based upon the capabilities of the client device to ingest certain media formats, and 2) preparing the media to be streamed.

In some examples, "streaming" of media broadly refers to the fragmenting and/or packetizing of the media so that the processed media can be delivered over the network in consecutive smaller-sized "chunks" logically organized and sequenced according to either or both the temporal or spatial structure of the media. In some examples, "transforming," which may sometimes be referred to as "transcoding," of media from a format A to a format B may be a process that is performed, usually by the network or by a service provider, prior to distributing the media to a target client device. Such transcoding may be comprised of converting the media from a format A to a format B based upon prior knowledge that format B is somehow a preferred format, or the only format, that can be ingested by the target client or is better suited for distribution over a constrained resource such as a commercial network. In some examples, both steps of transforming the media and preparing the media to be streamed are necessary before the media can be received and processed by the client from the network.

In some examples, the above one or two-step processes acted upon the ingested media by the network, such as prior to distributing the media to the client, results in a media format referred to as a "distribution media format," or simply, the "distribution format." In general, these steps can be performed only once, if performed at all for a given media data object, if the network has access to information to indicate that the client will need the transformed and or streamed media object for multiple occasions that otherwise would trigger the transformation and streaming of such media multiple times. That is, the processing and transfer of data for transformation and streaming of media is generally regarded as a source of latency with the requirement for expending potentially significant amount of network and or compute resources. Hence, a network design that does not have access to information to indicate when a client potentially already has a particular media data object stored in its cache or stored locally with respect to the client, will perform suboptimally to a network that does have access to such information.

In some examples, for legacy presentation devices, the distribution format may be equivalent or sufficiently equivalent to the "presentation format" ultimately used by the client device (e.g., client presentation device) to create the presentation. For example, a presentation media format is a media format whose properties (e.g., resolution, framerate, bit-depth, color gamut, etc., . . . ) are closely tuned to the capabilities of the client presentation device. Some examples of distribution vs. presentation formats cab include: a high-definition (HD) video signal (1920 pixel columns×1080 pixel rows) distributed by a network to an ultra-high-definition (UHD) client device with resolution (3840 pixel columns×2160 pixel rows). For example, an UHD client device can apply a process called "super-resolution" to the HD distribution format to increase the resolution of the video signal from HD to UHD. Thus, the final signal format that is presented by the UHD client device is the "presentation format" which, in this example, is a UHD signal, whereas the HD signal comprises the distribution format. In this example, the HD signal distribution format is very similar to the UHD signal presentation format because both signals are in a rectilinear video format, and the process to convert the HD format to a UHD format is a relatively straightforward and easy process to perform on most legacy client devices.

In some examples, the preferred presentation format for the target client device may be significantly different from the ingest format received by the network. Nevertheless, the target client device may have access to sufficient compute, storage, and bandwidth resources to transform the media from the ingest format into the necessary presentation format suitable for presentation by the target client device. In this scenario, the network may bypass the step of reformatting the ingested media, e.g., "transcoding" the media, from a format A to a format B simply because the client has access to sufficient resources to perform all media transforms without the network having to do so. However, the network may still perform the step of fragmenting and packaging the ingest media so that the media may be streamed to the client.

In some examples, the ingested media received by the network is significantly different from the preferred presentation format of the client, and the client does not have access to sufficient computing, storage, and or bandwidth resources to convert the media to the preferred presentation format. In such a scenario, the network may assist the client by performing some or all of the transformation from the ingest format into a format that is either equivalent or nearly equivalent to the preferred presentation format of the client on behalf of the client. In some architecture designs, such assistance provided by the network on behalf of the client is referred to as "split rendering" or "adaptation" of the media.

FIG. 1 shows a media flow process 100 (also referred to as process 100) in some examples. The media flow process 100 includes first steps that can be executed by in a network cloud (or an edge device) 104, and second steps that can be executed by a client device 110. In some examples, a media in an ingest media format A is received by a network from a content provider at a step 101. A step 102 that is a network process step can prepare the media for distribution to the client device 110 by formatting the media into a format B and or by preparing the media to be streamed to the client device 110. In a step 103, the media is streamed from the network cloud 104 to the client device 110 via a network connection 107. In some embodiments, the media can be streamed from the network cloud 104 to a media store 106, and the media is further be fetched from the media store 106 by the client device 110 via the network connection 107. The client device 110 receives the distribution media and can prepare the media for presentation via a render process as shown by 108. The output of render process 108 is the presentation media in yet another potentially different format C as shown by 109.

Figure 2:
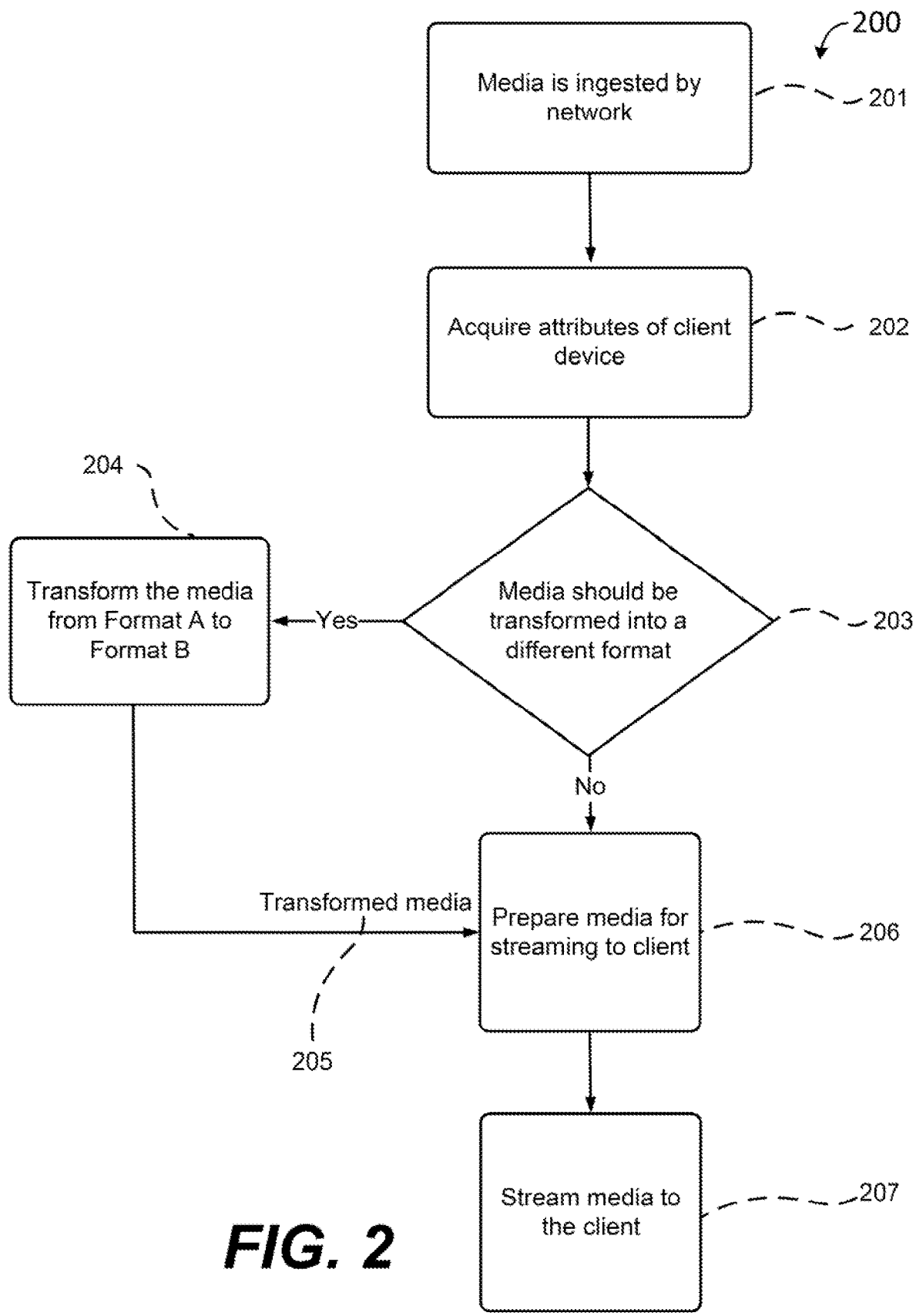
FIG. 2 shows a media transform decision making process in some examples.

FIG. 2 shows a media transform decision making process 200 (also referred to as process 200) that illustrates a network logic flow for processing ingested media within a network (also referred to as network cloud), for example by one or more devices in the network. At 201, a media is ingested by a network cloud from a content provider. The attributes for a target client device, if not already known, are acquired at 202. A decision making step 203 determines if the network should assist with the transformation of the media, if needed. The ingested media is transformed by a process step 204 to convert the media from a Format A into a Format B producing transformed media 205 when the decision making step 203 determines that the network should assist with the transformation. At 206, the media, either transformed or in its original form, is prepared to be streamed. At 207, the prepared media is suitably streamed to the target client device, such as a game engine client device.

An aspect to the logic in FIG. 2 is the decision making process 203 that may be performed by an automated process. That decision making step can determine whether the media can be streamed in its original ingested format A, or if the media needs to be transformed into a different format B to facilitate the presentation of the media by the target client device.

In some examples, the decision making process step 203 may require access to information that describes aspects or features of the ingest media, in such a way so as to aid the decision making process step 203 to make an optimal choice, i.e., to determine if a transformation of the ingest media is needed prior to streaming the media to the client, or if the media can be streamed in the original ingest format A directly to the client.

According to an aspect of the disclosure, given each of the above scenarios where transformations of media from a format A to another format may be done either entirely by the network, entirely by the client device, or jointly between both the network and the client device, e.g., for split rendering, a lexicon of attributes that describe a media format may be needed so that both the client device and network have complete information to characterize the transformation work. Furthermore, a lexicon that provides attributes of capabilities of a client, e.g., in terms of available compute resources, available storage resources, and access to bandwidth may likewise be needed. Even further, a mechanism to characterize the level of compute, storage, or bandwidth complexity of an ingest format may be needed so that a network and a client device may jointly, or singly, determine if or when the network may employ a split-rendering step for distributing the media to the client. Additionally, transformation and/or streaming of a particular media object may be needed by the client to complete the presentation. When the transformation and/or streaming of the particular media object has already been done as part of the work to process prior scenes for the presentation, the network may altogether skip the steps of transforming and/or streaming of the ingest media assuming that the client still has access or availability to the media that was previously streamed to the client. Finally, if the transformation from a Format A to another format is determined to be a necessary step to be performed either by or on behalf of the client, then a prioritization scheme for ordering the transformation processes of individual assets within the scene may benefit an intelligent and efficient network architecture.

One example of such a lexicon of attributes to characterize the media is the so-called Independent Mapping Space (IMS) nomenclature that is designed to help translate from one scene-graph format to another scene-graph format, or to a potentially entirely different scene-graph format. The Independent Mapping Space can be defined in Part 28 of the ISO/IEC 23090 suite of standard, and the suite is informally known as "MPEG-I." According to the scope of Part 28, the IMS includes metadata and other information that describe commonly used aspects of scene-based media formats. For example, scene-based media may commonly provide mechanisms to describe the geometry of a visual scene. One aspect of the IMS in ISO/IEC 23090 Part 28 is to provide standards-based metadata that can be used to annotate the human-readable portion of a scene graph so that the annotation can guide the translation from one format to another, such as from one scene geometry description to another scene geometry description. Many scene graph formats can provide a means to describe the features of a virtual camera that can be used as part of the rendering process to create a viewport into the scene. The IMS in Part 28 can provide metadata to describe commonly used camera types. The purpose of the IMS is to provide a nomenclature that can be used to describe the commonly-used aspects across multiple scene graph formats, so that the translation from one format to another is guided by the IMS.

Another aspect of ISO/IEC 23090 Part 28 is that no specified way may be available to complete the translation from one format to another format. Rather, the IMS simply provides guidance how to characterize common features of all scene graphs. Besides the geometry and camera features of a scene graph, other common features of scenes include lighting, and object surface properties such as albedo, materials, roughness, and smoothness.

With respect to the goal of translating one scene graph format X to another scene graph format Y, at least two potential problems may need to be solved. A first problem is to define a generic translation between two representations for a same type of media object, media attribute, or rendering function. For example, the IMS metadata for a static mesh object may be expressed with a generic code such as: IMS STATIC MESH. A scene graph represented by a syntax of a format X may refer to a static mesh using an identifier such as: FORMAT X STATIC MESH, where a scene graph represented by a syntax of a format Y may refer to a static mesh using an identifier such as: FORMAT Y STATIC MESH. The definition of a generic translation via the use of the IMS in ISO/IEC 23090 Part 28 may include the mappings of FORMAT X STATIC MESH to IMS STATIC MESH, and FORMAT Y STATIC MESH to IMS STATIC MESH. Hence, a generic translation from a format X static mesh to a format Y static mesh is facilitated through the metadata IMS STATIC MESH from IMS of ISO/IEC 23090 Part 28.

A second problem is to annotate individual objects and other parts of the scene graph for a specific instance of a scene graph, such as a scene graph representation using a format X, with the metadata including the IMS. That is, the metadata used to annotate a specific instance of a scene graph should be directly related to associated individual media objects, media attributes, and rendering features of the scene graph.

A scene graph can generally be data structure commonly used by vector-based graphics editing applications and modern computer games, which arranges the logical and often (but not necessarily) spatial representation of a graphical scene, a collection of nodes, and vertices in a graph structure. Attributes (or features) of a scene graph can be described based on one or more scene graph formats.

A scene, in the context of computer graphics, is a collection of objects (e.g., 3D assets), object attributes, and other metadata that comprise the visual, acoustic, and physics-based characteristics describing a particular setting that is bounded either by space or time with respect to the interactions of the objects within that setting.

A node can be a fundamental element of the scene graph comprised of information related to the logical or spatial or temporal representation of visual, audio, haptic, olfactory, gustatory, or related processing information; each node shall have at most one output edge, zero or more input edges, and at least one edge (either input or output) connected to it.

A base layer can be a nominal representation of an asset, usually formulated to minimize the compute resources or time needed to render the asset, or the time to transmit the asset over a network.

An enhancement layer can be a set of information that when applied to the base layer representation of an asset, augments the base layer to include features or capabilities that are not supported in the base layer.

An attribute can indicate metadata associated with a node used to describe a particular characteristic or feature of that node either in a canonical or more complex form (e.g., in terms of another node).

A binding lookup table (LUT) can be a logical structure that associates metadata from the IMS of ISO/IEC 23090 Part 28 with metadata or other mechanisms used to describe features or functions of a specific scene graph format, such as ITMF, glTF, and Universal Scene Description.

A container can indicate a serialized format to store and exchange information to represent all natural, all synthetic, or a mixture of synthetic and natural scenes including a scene graph and all of the media resources that are required for rendering of the scene.

Serialization can be a process of translating data structures or object state into a format that can be stored (for example, in a file or memory buffer) or transmitted (for example, across a network connection link) and reconstructed later (possibly in a different computer environment). When the resulting series of bits is reread according to the serialization format, it can be used to create a semantically identical clone of the original object.

A renderer can be a (typically software-based) application or process. Based on a selective mixture of disciplines related to acoustic physics, light physics, visual perception, audio perception, mathematics, and software development, given an input scene graph and asset container, the render can emit a typically visual and/or audio signal suitable for presentation on a targeted device or conforming to the desired properties as specified by attributes of a render target node in the scene graph. For visual-based media assets, a renderer may emit a visual signal suitable for a targeted display, or for storage as an intermediate asset (e.g., repackaged into another container that is used in a series of rendering processes in a graphics pipeline). For audio-based media assets, a renderer may emit an audio signal for presentation in a multi-channel loudspeaker and/or binauralized headphones, or for repackaging into another (output) container. Popular examples of renderers can include the real-time rendering features of the game engines Unity and Unreal Engine.

Evaluate can produce a result (e.g., similar to evaluation of a Document Object Model for a webpage) that causes the output to move from an abstract to a concrete result.

A scripting language can be an interpreted programming language that can be executed by a renderer at runtime to process dynamic input and variable state changes made to the scene graph nodes, which affect rendering and evaluation of spatial and temporal object topology (e.g., physical forces, constraints, inverse kinematics, deformation, collisions), and energy propagation and transport (light, sound).

A shader can be a type of computer program that was originally used for shading (the production of appropriate levels of light, darkness, and color within an image) but which now performs a variety of specialized functions in various fields of computer graphics special effects or does video post-processing unrelated to shading, or even functions unrelated to graphics at all.

A path tracing can be a computer graphics method of rendering three-dimensional scenes such that the illumination of the scene is faithful to reality.

Timed media can be media that is ordered by time, such as start time and/or end time according to a particular clock.

Untimed media can be media that is organized by spatial, logical, or temporal relationships, such as in an interactive experience that is realized according to the actions taken by the user(s).

A neural network model can be a collection of parameters and tensors (e.g., matrices) that define weights (e.g., numerical values) used in well-defined mathematical operations applied to the visual signal to arrive at an improved visual output. The visual output can include the interpolation of new views for the visual signal that were not explicitly provided by the original signal.

Frame-based media can be a 2D video with or without associated audio.

Scene-based media can include audio, visual, haptic, and other primary types of media and media-related information organized logically and spatially by a use of a scene graph.

OCS can be a human-readable portion of an ITMF scene graph that uses unique identifiers denoted as 'id=nnn', where 'nnn' is an integer value.

IMS can be Independent Mapping Space metadata that is standardized based on a video standard, such as ISO/IEC 23090 Part 28.

glTF extensions is an extension mechanism of glTF that allows the base glTF format to be extended with new capabilities. Any glTF object may have an optional extensions property.

In the last decade, a number of immersive media-capable devices have been introduced into the consumer market, including head-mounted displays, augmented-reality glasses, hand-held controllers, multi-view displays, haptic gloves, and game consoles. Likewise, holographic displays and other forms of volumetric displays are poised to emerge into the consumer market within the next three to five years. Despite the immediate or imminent availability of these devices, a coherent end-to-end ecosystem for the distribution of immersive media over commercial networks has failed to materialize for several reasons.

One of the impediments to realize a coherent end-to-end ecosystem for distribution of immersive media over commercial networks is that the client devices that serve as end-points for such a distribution network for immersive displays are all very diverse. Some of them support certain immersive media formats while others do not. Some of them are capable of creating an immersive experience from legacy raster-based formats, while others cannot. Unlike a network designed only for distribution of legacy media, a network that must support a diversity of display clients may need a significant amount of information pertaining to the specifics of each of the capabilities of the client, and the formats of the media to be distributed before such network can employ an adaptation process to translate the media into a format suitable for each target display and corresponding application. Such a network, at a minimum, may need access to information describing the characteristics of each target display and the complexity of the ingested media in order for the network to ascertain how to meaningfully adapt an input media source to a format suitable for the target display and application.

Likewise, an ideal network supporting heterogeneous clients can leverage the fact that some of the assets that are adapted from an input media format to a specific target format may be reused across a set of similar display targets. That is, some assets, once converted to a format suitable for a target display may be reused across a number of such displays that have similar adaptation requirements. Therefore, such an ideal network can employ a caching mechanism to store adapted assets into an area that is relatively immutable, which can be similar to the use of Content Distribution Networks (CDNs) in use for legacy networks.

Moreover, immersive media may be organized into "scenes," such as "scene-based media," that are described by scene graphs. The scene can also be referred to as scene descriptions. The scope of a scene graph is to describe visual, audio, and other forms of immersive assets that include a particular setting. The particular setting can be a part of a presentation. For example, actors and events take place in a particular location in a building that is part of a presentation (e.g., movie). A list of all scenes that comprise a single presentation may be formulated into a manifest of scenes.

An additional benefit of such an approach is that for a content that is prepared in advance of having to distribute such content, a "bill of materials" can be created that identifies all of the assets that will be used for the entire presentation, and how often each asset is used across the various scenes within the presentation. An ideal network should have knowledge of the existence of cached resources that can be used to satisfy the asset requirements for a particular presentation. Similarly, a client that presents a series of scenes may wish to have knowledge about the frequency of any given asset to be used across multiple scenes. For example, if a media asset (also known as an "object") is referenced multiple times across multiple scenes that are or will be processed by the client, then the client should avoid discarding the asset from its caching resources until the last scene that requires that particular asset has been presented by the client.

Furthermore, such a process can produce a "bill of materials" for a given scene or for a collection of scenes. The process can also annotate the scene(s) with standardized metadata, such as the IMS of ISO/IEC 23090 Part 28, to facilitate the adaptation of a scene from one format to another format.

The disclosed subject matter addresses a need for a mechanism or a process that analyzes an immersive media scene and annotates a scene with standardized metadata, such as from the IMS of ISO/IEC 23090 Part 28. The annotation can facilitate a process that translates the scene graph from one format to another target format, where a target format is a potentially more suitable format for distribution to one or more clients.

The disclosed subject matter addresses the need for a mechanism or process that analyzes an immersive media scene to obtain sufficient information. The information can be used to support a decision-making process that, when employed by a network or a client, provides an indication as to whether the transformation of a media object (or media asset) from a Format A to a Format B should be performed either entirely by the network, entirely by the client, or via a mixture of both (along with an indication of which assets should be transformed by the client or network). Such an "immersive media data complexity analyzer" may be employed by either a client or a network in an automated context, or by a human in a manual context.

Note that the remainder of the disclosed subject matter assumes, without loss of generality, that the process of adapting an input immersive media source to a specific end-point client device is the same as, or similar to, the process of adapting the same input immersive media source to the specific application that is being executed on the specific client end-point device. That is, the problem of adapting an input media source to the characteristics of an end-point device are of the same complexity as the problem to adapt a specific input media source to the characteristics of a specific application.

Further note that the term "media object" and "media asset" may be used interchangeably, both referring to a specific instance of a specific format of media. The term client device or client (without any qualification) refers to the device and its constituent components on which the presentation of the media is ultimately performed.

Referring back to FIG. 1, the media flow process 100 demonstrates the flow of media through the network 104 or distribution to the client device 110. In FIG. 1, processing of an ingest media format A is performed by processing in a cloud or edge devices 104. Note that the same processing may be performed in a manual process or by a client. At step 101, the media obtained from a content provider (not shown). A process step 102 performs any necessary transformations or conditioning of the ingested media to create a potentially alternative representation of the media as a distribution format B. Media formats A and B may or may not be representations following the same syntax of a particular media format specification, however the format B is likely to be conditioned at step 103 into a scheme that facilitates the distribution of the media over a network protocol such as TCP or UDP. Such "streamable" media is depicted at the step 105 as media that is streamed to a media store 106. The client 110 can access the media from the media store 106 at step 107 via a fetching process, such as ISO/IEC 23009 Dynamic Adaptive Streaming over HTTP. The client (or client device) 110 can have access to some rendering capabilities depicted at step 108. The render process shown at step 108 can be rudimentary or likewise, sophisticated, depending on the type of client 110 that is being targeted. The Render process show at step 108 can create presentation media 109 that may or may not be represented according to a third format specification, e.g., Format C.

Referring to FIG. 2, the media transform decision making process 200 can be employed to determine if the network needs to transform the media prior to distributing the media to a client device. In FIG. 2, the ingested media 201 represented in format A is provided by a content provider (not depicted) to the network. The process step 202 acquires attributes that describe the processing capabilities of targeted client (not depicted). Decision making process step 203 is employed to determine if the network or the client should perform any format conversions for any of the media assets contained within the ingested media 201, e.g., such as a conversion of a particular media object from a format A to a format B, prior to the media being streamed to the client. If any of the media assets needs to be transformed by the network, then the network employs process step 204 to transform the media object from format A to format B. The transformed media 205 is the output from process step 204. The transformed media is merged into the preparation process 206 to prepare the media to be streamed to the game engine client (not shown). The process step 207 streams the prepared media to the game engine client for example.

Figure 3:
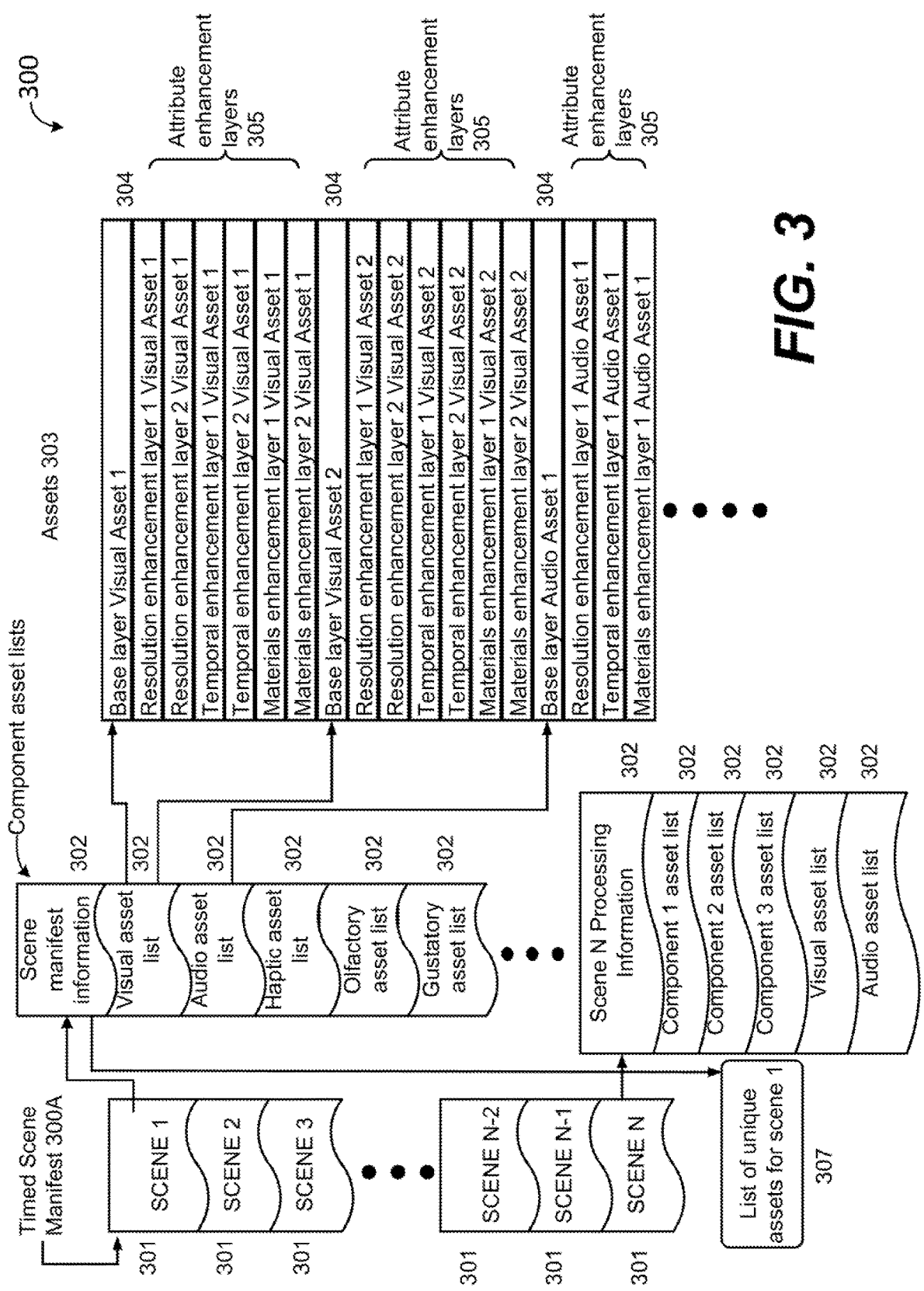
FIG. 3 shows a representation of a format for heterogenous immersive media that is timed in an example.
Figure 4:
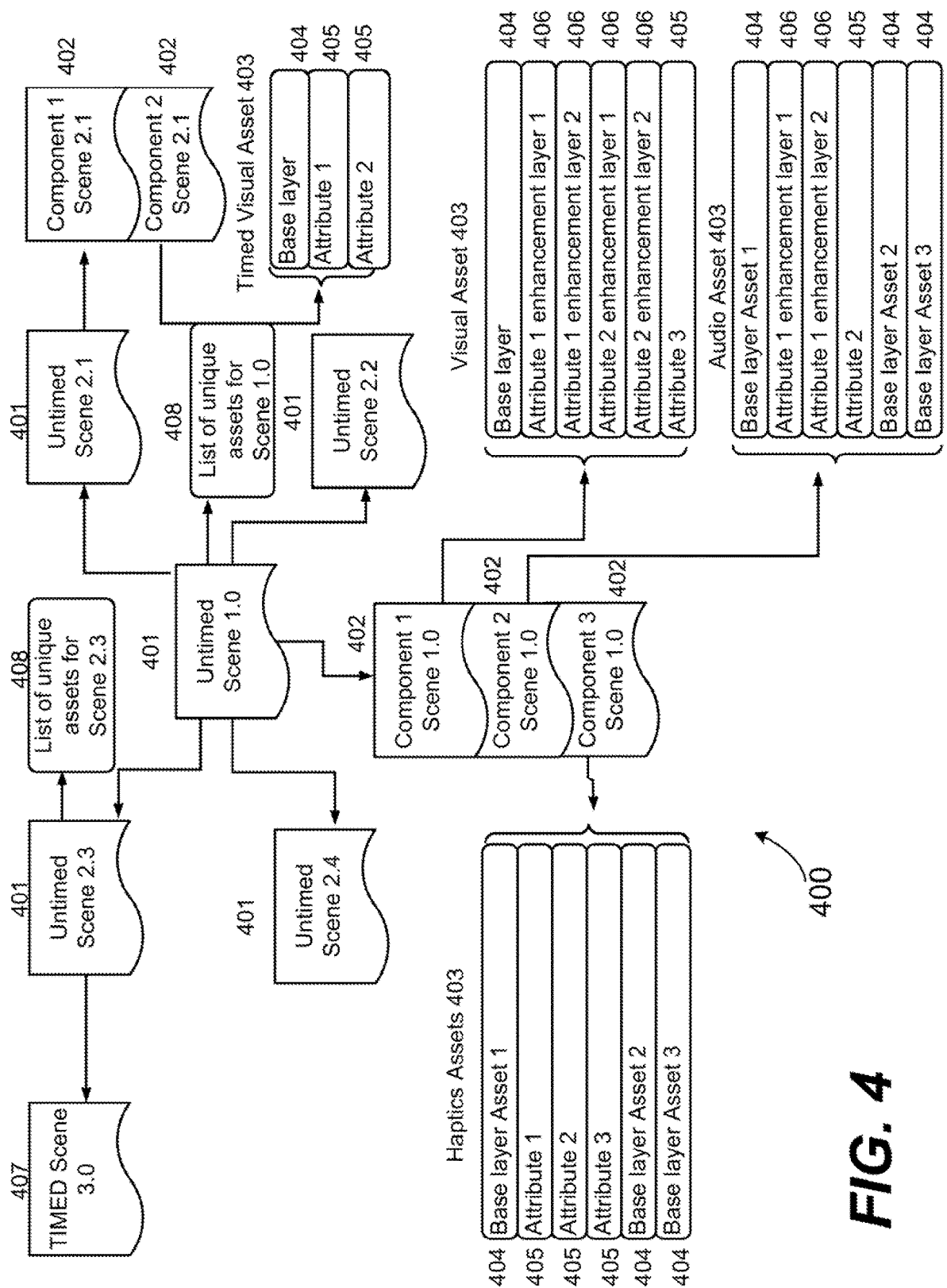
FIG. 4 shows a representation of a streamable format for heterogeneous immersive media that is untimed in an example.

FIG. 3 shows a representation of a streamable format 300 for heterogenous immersive media that is timed in an example. FIG. 4 shows a representation of a streamable format 400 for heterogeneous immersive media that is untimed in an example. In the case of FIG. 3, FIG. 3 refers to a scene 301 for timed media. In the case of FIG. 4, FIG. 4 refers to a scene 401 for untimed media. For both cases, a scene may be embodied by various scene representations, or scene descriptions.

For example, in some immersive media designs, a scene may be embodied by a scene graph, or as a multi-plane image (MPI), or as a multi-spherical image (MSI). Both the MPI and MSI techniques are examples of technologies that aid in the creation of display-agnostic scene representations for natural content, such as images of the real world captured simultaneously from one or more cameras. Scene graph technologies, on the other hand, may be employed to represent both natural and computer-generated imagery in the form of synthetic representations. Such representations can be especially computation-intensive to create for the case when the content is captured as natural scenes by one or more cameras. That is, scene graph representations of a naturally-captured content are both time and computation-intensive to create, requiring complex analysis of natural images with techniques of photogrammetry or deep learning or both, in order to create synthetic representations that can subsequently be used to interpolate sufficient and adequate numbers of views to fill a viewing frustum of a target immersive client display. As a result, such synthetic representations may be impractical to consider as candidates for representing natural content, because they may not practically be created in real-time for consideration of use cases that require real-time distribution. In some examples, the best candidate representations for computer generated imagery is to employ the use of a scene graph with synthetic models, as computer generated imagery is created using 3D modeling processes and tools.

Such a dichotomy in optimal representations of both natural and computer generated content suggests that the optimal ingest format for naturally-captured content is different from the optimal ingest format for computer generated content or for natural content that is not essential for real-time distribution applications. Therefore, the disclosed subject matter targets to be robust enough to support multiple ingest formats for visually immersive media, whether they are created naturally through the use of physical cameras or by a computer.

Exemplary technologies that embody scene graphs as a format suitable for representing visual immersive media can include ORBX by OTOY, universal scene description by Pixar, and glTF2.0 by Khronos. The visual immersive media can be created using computer generated techniques, or naturally captured content for which deep learning or photogrammetry techniques are employed to create the corresponding synthetic representations of a natural scene. The nature scene may not be essential for real-time distribution applications.

ORBX by OTOY is one of several scene graph technologies that is able to support any type of visual media, timed or untimed, including ray-traceable, legacy (frame-based), volumetric, and other types of synthetic or vector-based visual formats. According to an aspect, ORBX is unique from other scene graphs because ORBX provides native support for freely available and/or open source formats for meshes, point clouds, and textures. ORBX is a scene graph that has been intentionally designed with the goal of facilitating interchange across multiple vendor technologies that operate on scene graphs. Moreover, ORBX provides a rich materials system, support for open shader language, a robust camera system, and support for Lua scripts. ORBX is also the basis of the immersive technologies media format published for license under royalty-free terms by the immersive digital experiences alliance (IDEA). In the context of real time distribution of media, the ability to create and distribute an ORBX representation of a natural scene is a function of the availability of compute resources to perform a complex analysis of the camera-captured data and synthesis of the same data into synthetic representations. To date, the availability of sufficient compute for real-time distribution is not practical, but nevertheless, not impossible.

Universal scene description (USD) by Pixar is another scene graph that can be used in the visual effects (VFX) and professional content production communities. USD is integrated into the Nvidia Omniverse platform which is a set of tools for developers for 3D model creation and rendering with Nvidia GPUs. A subset of USD was published by Apple and Pixar as USDZ. USDZ is supported by the Apple ARKit.

glTF2.0 is the most recent version of the graphics language transmission format specification written by the Khronos 3D Group. This format supports a simple scene graph format that is generally capable of supporting static (untimed) objects in scenes, including "png" and "jpeg" image formats. glTF2.0 supports simple animations, including support for translate, rotate, and scale, of basic shapes described using the glTF primitives, such as for geometric objects. glTF2.0 does not support timed media, and hence does not support video nor audio.

ISO/IEC 23090 Part 14 Scene Description is an extension of glTF2.0 that adds support for timed media, e.g., video and audio.

It is noted that the above scene representations of immersive visual media are provided for example only, and do not limit the disclosed subject matter in its ability to specify a process to adapt an input immersive media source into a format that is suitable to the specific characteristics of a client end-point device.

Moreover, any or all of the above example media representations either currently employ or may employ deep learning techniques to train and create a neural network model. The neural network model can enable or facilitate the selection of specific views to fill a particular display's viewing frustum based on the specific dimensions of the frustum. The views that are chosen for the particular display's viewing frustum may be interpolated from existing views that are explicitly provided in the scene representation, such as from the MSI or MPI techniques, or they may be directly rendered from render engines based on specific virtual camera locations, filters, or descriptions of virtual cameras for these render engines.

Embodiments of the disclosure can therefore be robust enough to consider a relatively small set of immersive media ingest formats that is sufficiently capable to satisfy requirements both for real-time or "on-demand" (e.g., non-real-time) distribution of media that is either captured naturally (e.g., with one or more cameras) or created using computer generated techniques.

Interpolation of views from an immersive media ingest format by use of either neural network models or network-based render engines is further facilitated as advanced network technologies such as 5G for mobile networks, and fiber optical cable for fixed networks are deployed. That is, these advanced network technologies increase the capacity and capabilities of commercial networks because such advanced network infrastructures can support transport and delivery of increasingly larger amounts of visual information. Network infrastructure management technologies such as multi-access edge computing (MEC), software defined networks (SDN), and network functions virtualization (NFV), enable commercial network service providers to flexibly configure their network infrastructure to adapt to changes in demand for certain network resources, such as to respond to dynamic increases or decreases in demand for network throughputs, network speeds, roundtrip latency, and compute resources. Moreover, this inherent ability to adapt to dynamic network requirements likewise facilitates the ability of networks to adapt immersive media ingest formats to suitable distribution formats in order to support a variety of immersive media applications with potentially heterogenous visual media formats for heterogenous client end-points.

Immersive media applications themselves may also have varying requirements for network resources including gaming applications which require significantly lower network latencies to respond to real-time updates in the state of the game, telepresence applications which have symmetric throughput requirements for both the uplink and downlink portions of the network, and passive viewing applications that may have increased demand for downlink resources depending on the type of client end-point display that is consuming the data. In general, any consumer-facing application may be supported by a variety of client end-points with various onboard-client capabilities for storage, compute, and power, and likewise various requirements for particular media representations.

Embodiments of the disclosure therefore can enable a sufficiently equipped network, such as a network that employs some or all of the characteristics of a modern network, to simultaneously support a plurality of legacy and immersive media-capable devices according to features that are specified. The features can be shown as follows:

(1) Provide flexibility to leverage media ingest formats that are practical for both real-time and on demand use cases for the distribution of media.
(2) Provide flexibility to support both natural and computer-generated content for both legacy and immersive-media capable client end-points.
(3) Support both timed and untimed media.
(4) Provide a process for dynamically adapting a source media ingest format to a suitable distribution format based on the features and capabilities of the client end-point, as well as based on the requirements of the application.
(5) Ensure that the distribution format is streamable over IP-based networks.
(6) Enable the network to simultaneously serve a plurality of heterogenous client end-points that may include both legacy and immersive media-capable devices.
(7) Provide an exemplary media representation framework that facilitates the organization of the distribution media along scene boundaries.

An end-to-end embodiment of the improvements enabled by the disclosed subject matter can be achieved according to the processing and components described in the following detailed description.

FIG. 3 and FIG. 4 respectively employ an exemplary encompassing distribution format that can be adapted from an ingest source format to match the capabilities of a specific client end-point. As described above, the media that is shown in FIG. 3 is timed and the media that is shown in FIG. 4 is untimed. The specific encompassing format is robust enough in its structure to accommodate a large variety of media attributes that each may be layered based on the amount of salient information that each layer contributes to the presentation of the media. It is noted that the layering process can be applied in, for example progressive JPEG and scalable video architectures (e.g., specified in ISO/IEC 14496-10 Scalable Advanced Video Coding).

According to an aspect, the media that is streamed according to the encompassing media format is not limited to legacy visual and audio media. The media can include any type of media information that is capable of producing a signal that interacts with machines to stimulate the human senses for sight, sound, taste, touch, and smell.

According to another aspect, the media that is streamed according to the encompassing media format can be both timed or untimed media, or a mixture of both.

According to another aspect, the encompassing media format is furthermore streamable by enabling a layered representation for media objects by use of a base layer and enhancement layer architecture. In one example, the separate base layer and enhancement layers are computed by application of multi-resolution or multi-tessellation analysis techniques for media objects in each scene. This is analogous to the progressively rendered image formats specified in ISO/IEC 10918-1 (JPEG), and ISO/IEC 15444-1 (JPEG2000), but not limited to raster-based visual formats. In an example, a progressive representation for a geometric object could be a multi-resolution representation of the object computed using wavelet analysis.

In another example of the layered representation of the media format, the enhancement layers apply different attributes to the base layer, such as refining the material properties of the surface of a visual object that is represented by the base layer. In yet another example, the attributes may refine the texture of the surface of the base layer object, such as changing the surface from a smooth to a porous texture, or from a matted surface to a glossy surface.

In yet another example of the layered representation, the surfaces of one or more visual objects in the scene may be altered from being Lambertian to being ray-traceable.

In yet another example of the layered representation, the network will distribute the base-layer representation to the client so that the client may create a nominal presentation of the scene while the client awaits the transmission of additional enhancement layers to refine the resolution or other characteristics of the base representation.

According to another aspect, the resolution of the attributes or refining information in the enhancement layers is not explicitly coupled with the resolution of the object in the base layer as it is today in existing MPEG video and JPEG image standards.

According to another aspect, the encompassing media format supports any type of information media that can be presented or actuated by a presentation device or machine, thereby enabling the support of heterogenous media formats to heterogenous client end-points. In one embodiment of a network that distributes the media format, the network will first query the client end-point to determine the client's capabilities, and if the client is not capable of meaningfully ingesting the media representation then the network will either remove the layers of attributes that are not supported by the client, or adapt the media from its current format into a format that is suitable for the client end-point. In one example of such adaptation, the network would convert a volumetric visual media asset into a 2D representation of the same visual asset, by use of a Network-Based Media Processing protocol. In another example of such adaptation, the network may employ a neural network process to reformat the media to an appropriate format or optionally synthesize views that are needed by the client end-point.

According to another aspect, the manifest for a complete or partially-complete immersive experience (live streaming event, game, or playback of on-demand asset) is organized by scenes which is the minimal amount of information that rendering and game engines can currently ingest in order to create a presentation. The manifest includes a list of the individual scenes that are to be rendered for the entirety of the immersive experience requested by the client. Associated with each scene are one or more representations of the geometric objects within the scene corresponding to streamable versions of the scene geometry. One embodiment of a scene representation refers to a low-resolution version of the geometric objects for the scene. Another embodiment of the same scene refers to an enhancement layer for the low-resolution representation of the scene to add additional detail, or increase tessellation, to the geometric objects of the same scene. As described above, each scene may have more than one enhancement layer to increase the detail of the geometric objects of the scene in a progressive manner.

According to another aspect, each layer of the media objects that are referenced within a scene is associated with a token (e.g., URI) that points to the address of where the resource can be accessed within the network. Such resources are analogous to CDN's where the content may be fetched by the client.

According to another aspect, the token for a representation of a geometric object may point to a location within the network or to a location within the client. That is, the client may signal to the network that its resources are available to the network for network-based media processing.

FIG. 3 shows a timed media representation 300 in some examples. The timed media representation 300 describes an example of the encompassing media format for timed media. A timed scene manifest 300A includes a list of scene information 301. A scene information 301 refers to a list of components 302 that separately describe processing information and types of media assets that are in the scene information 301. The components 302 refer to assets 303 that further refer to base layers 304 and attribute enhancement layers 305. In the FIG. 3 example, each of the base layers 304 refer to a numeric frequency metric that indicates the number of times the asset is used across the set of scenes in the presentation. A list of unique assets that have not been previously used in other scenes is provided in 307.

FIG. 4 shows an untimed media representation 400 in some examples. The untimed media representation 400 describes an example of the encompassing media format for untimed media. An untimed scene manifest (not depicted) references a Scene 1.0 for which there is no other scene that can branch to Scene 1.0. The scene information 401 is not associated with a start and end duration according to a clock. The scene information 401 refers to a list of components 402 that separately describe processing information and types of media assets that comprise the scene. The components 402 refer to assets 403 that further refer to base layers 404 and attribute enhancement layers 405 and 406. In the FIG. 4 example, each of the base layers 404 refer to a numeric frequency value that indicates the number of times the asset is used across the set of scenes in the presentation. Furthermore, the Scene Information 401 can refer to other Scenes Information 401 that are for untimed media. The Scene Information 401 can also refer to Scene Information 407 that is for a timed media scene. Lists 406 identify unique assets associated with a particular scene that have not been previously used in higher order (e.g., parent) scenes.

Figure 5:
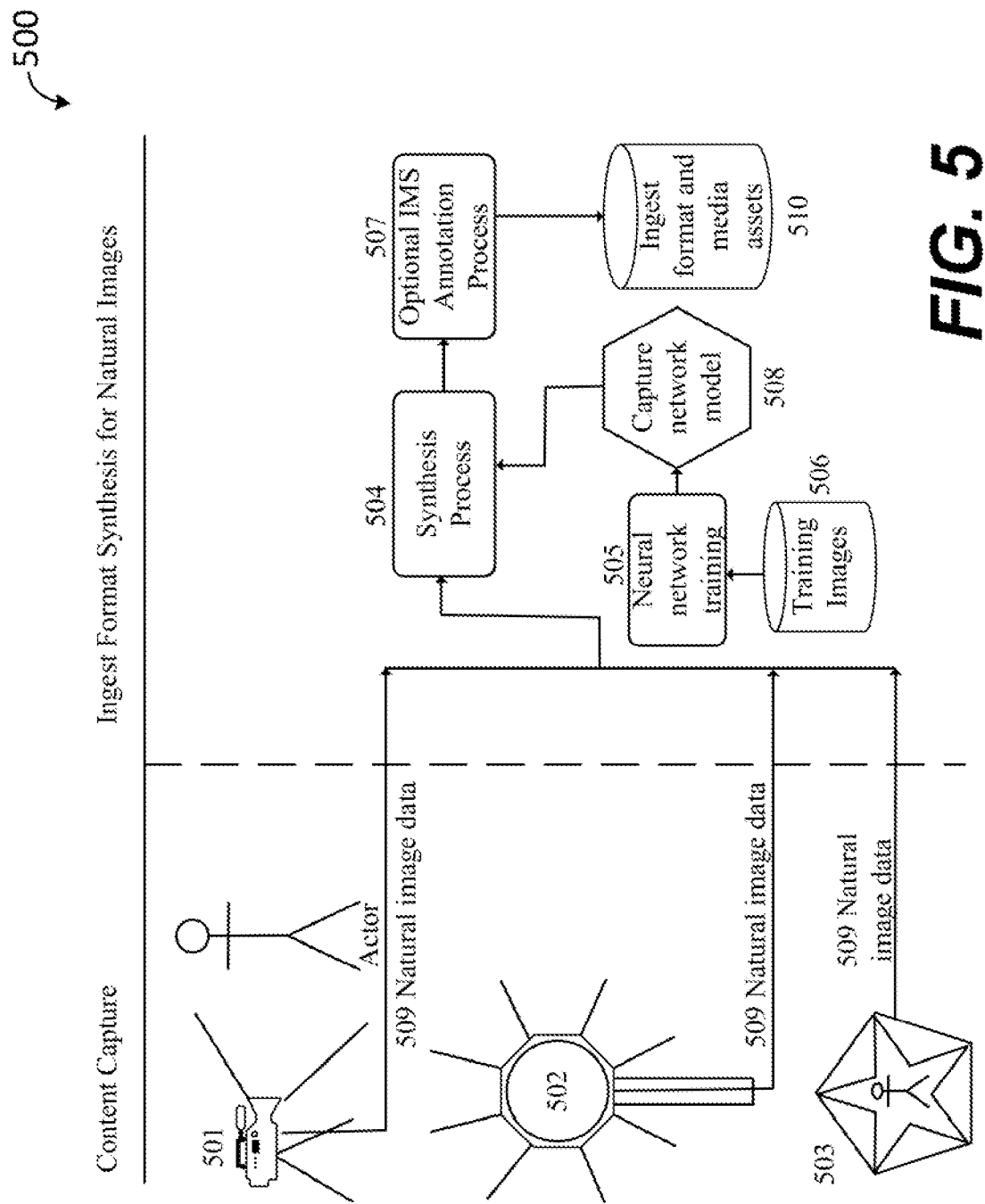
FIG. 5 shows a diagram of process to synthesize media into an ingest format from a natural content in some examples.

FIG. 5 shows a diagram of process 500 to synthesize an ingest format from natural content. The process 500 includes a first sub-process for content capture and a second sub-process of ingest format synthesis for natural images.

In the FIG. 5 example, in the first sub-process, camera unit can be used to capture natural image content 509. For example, camera unit 501 can use a single camera lens to capture a scene of a person. Camera unit 502 can capture a scene with five diverging fields of view by mounting five camera lenses around a ring-shaped object. The arrangement in the camera unit 502 is an exemplary arrangement for capturing omnidirectional content for VR applications. Camera unit 503 captures a scene with seven converging fields of view by mounting seven camera lenses on the inner diameter portion of a sphere. The arrangement in the camera unit 503 is an exemplary arrangement for capturing light fields for light field or holographic immersive displays.

In the FIG. 5 example, in the second sub-process, natural image content 509 can be provided as input to a synthesis Process 504 that may optionally employ a neural network training process 505 using a collection of training images 506 to produce an optional capture neural network model (or model) 508. Another process commonly used in lieu of training process 505 is photogrammetry. If the model 508 is created during the process 500 depicted in FIG. 5, then model 508 can become one of the assets in the Ingest Format 510 for the natural content. Annotation process 507 may optionally be performed to annotate scene-based media with IMS metadata. Exemplary embodiments of the Ingest Format 510 include MPI and MSI.

Figure 6:
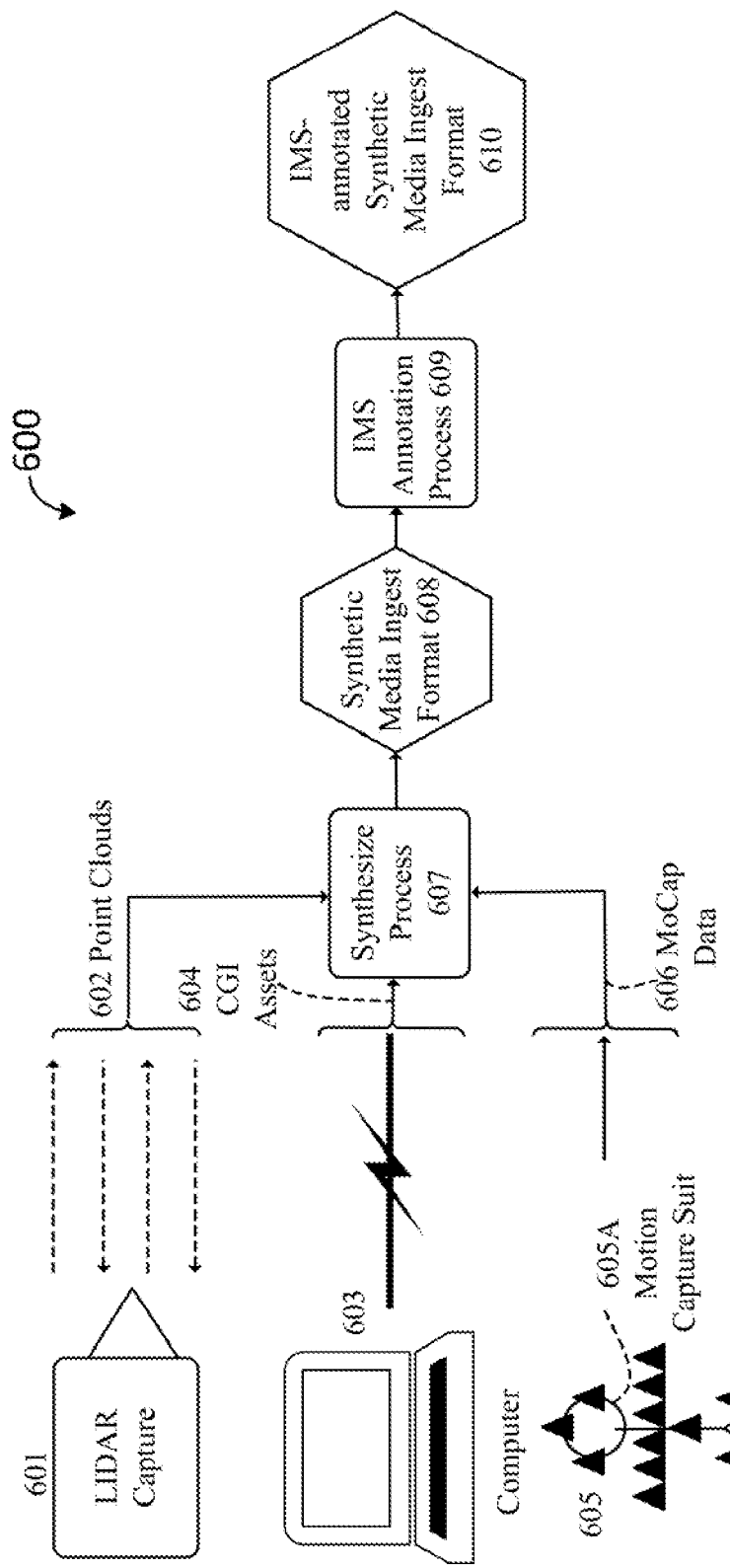
FIG. 6 shows a diagram of a process to create an ingest format for synthetic media in some examples.

FIG. 6 shows a diagram of a process 600 to create an ingest format for synthetic media 608, e.g., computer-generated imagery. In the FIG. 6 example, LIDAR camera 601 captures point clouds 602 of a scene. Computer-generated imagery (CGI) tools, 3D modelling tools, or another animation processes to create synthetic content are employed on computer 603 to create 604 CGI assets over a network. Motion capture suit with sensors 605A can be worn on actor 605 to capture a digital recording of the motion for actor 605 to produce animated motion capture (MoCap) Data 606. Data 602, 604, and 606 can be provided as input to a synthesis process 607 which outputs synthetic media ingest format (or format) 608. The format 608 may then be input into an optional IMS annotation process 609 whose output is IMS-annotated Synthetic Media Ingest Format 610.

The techniques for representing, streaming and processing heterogeneous immersive media in the present disclosure can be implemented as computer software using computer-readable instructions and physically stored in one or more computer-readable media. For example, FIG. 7 shows a computer system 700 suitable for implementing certain embodiments of the disclosed subject matter.

The computer software can be coded using any suitable machine code or computer language, that may be subject to assembly, compilation, linking, or like mechanisms to create code comprising instructions that can be executed directly, or through interpretation, micro-code execution, and the like, by one or more computer central processing units (CPUs), Graphics Processing Units (GPUs), and the like.

The instructions can be executed on various types of computers or components thereof, including, for example, personal computers, tablet computers, servers, smartphones, gaming devices, internet of things devices, and the like.

Figure 7:
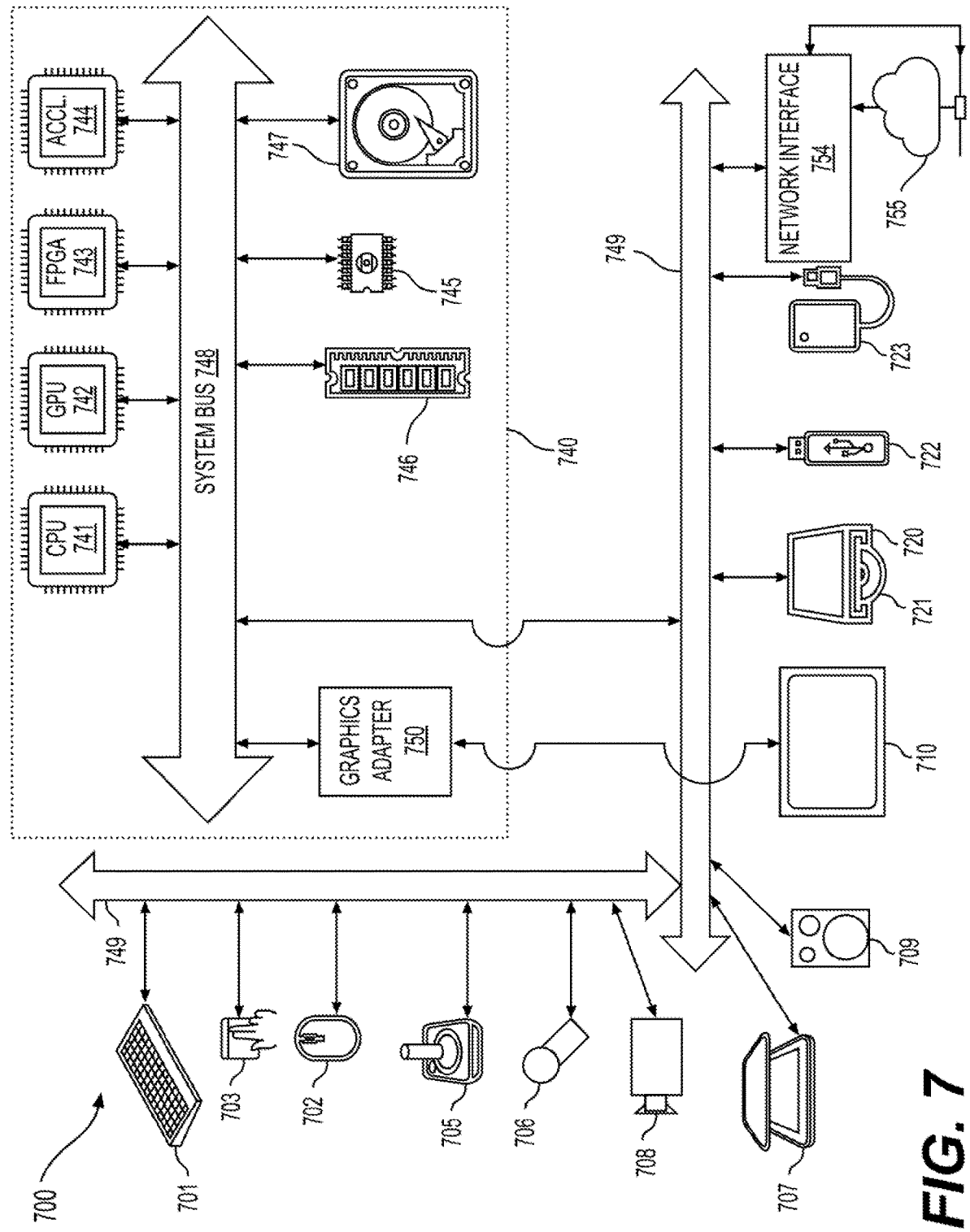
FIG. 7 is a schematic illustration of a computer system in accordance with an embodiment.

The components shown in FIG. 7 for computer system 700 are exemplary in nature and are not intended to suggest any limitation as to the scope of use or functionality of the computer software implementing embodiments of the present disclosure. Neither should the configuration of components be interpreted as having any dependency or requirement relating to any one or combination of components illustrated in the exemplary embodiment of a computer system 700.

Computer system 700 may include certain human interface input devices. Such a human interface input device may be responsive to input by one or more human users through, for example, tactile input (such as: keystrokes, swipes, data glove movements), audio input (such as: voice, clapping), visual input (such as: gestures), olfactory input (not depicted). The human interface devices can also be used to capture certain media not necessarily directly related to conscious input by a human, such as audio (such as: speech, music, ambient sound), images (such as: scanned images, photographic images obtain from a still image camera), video (such as two-dimensional video, three-dimensional video including stereoscopic video).

Input human interface devices may include one or more of (only one of each depicted): keyboard 701, mouse 702, trackpad 703, touch screen 710, data-glove (not shown), joystick 705, microphone 706, scanner 707, camera 708.

Computer system 700 may also include certain human interface output devices. Such human interface output devices may be stimulating the senses of one or more human users through, for example, tactile output, sound, light, and smell/taste. Such human interface output devices may include tactile output devices (for example tactile feedback by the touch-screen 710, data-glove (not shown), or joystick 705, but there can also be tactile feedback devices that do not serve as input devices), audio output devices (such as: speakers 709, headphones (not depicted)), visual output devices (such as screens 710 to include CRT screens, LCD screens, plasma screens, OLED screens, each with or without touch-screen input capability, each with or without tactile feedback capability—some of which may be capable to output two dimensional visual output or more than three dimensional output through means such as stereographic output; virtual-reality glasses (not depicted), holographic displays and smoke tanks (not depicted)), and printers (not depicted).

Computer system 700 can also include human accessible storage devices and their associated media such as optical media including CD/DVD ROM/RW (720) with CD/DVD or the like media 721, thumb-drive 722, removable hard drive or solid state drive 723, legacy magnetic media such as tape and floppy disc (not depicted), specialized ROM/ASIC/PLD based devices such as security dongles (not depicted), and the like.

Those skilled in the art should also understand that term "computer readable media" as used in connection with the presently disclosed subject matter does not encompass transmission media, carrier waves, or other transitory signals.

Computer system 700 can also include an interface 754 to one or more communication networks 755. Networks can for example be wireless, wireline, optical. Networks can further be local, wide-area, metropolitan, vehicular and industrial, real-time, delay-tolerant, and so on. Examples of networks include local area networks such as Ethernet, wireless LANs, cellular networks to include GSM, 3G, 4G, 5G, LTE and the like, TV wireline or wireless wide area digital networks to include cable TV, satellite TV, and terrestrial broadcast TV, vehicular and industrial to include CANBus, and so forth. Certain networks commonly require external network interface adapters that attached to certain general purpose data ports or peripheral buses 749 (such as, for example USB ports of the computer system 700); others are commonly integrated into the core of the computer system 700 by attachment to a system bus as described below (for example Ethernet interface into a PC computer system or cellular network interface into a smartphone computer system). Using any of these networks, computer system 700 can communicate with other entities. Such communication can be uni-directional, receive only (for example, broadcast TV), uni-directional send-only (for example CANbus to certain CANbus devices), or bi-directional, for example to other computer systems using local or wide area digital networks. Certain protocols and protocol stacks can be used on each of those networks and network interfaces as described above.

Aforementioned human interface devices, human-accessible storage devices, and network interfaces can be attached to a core 740 of the computer system 700.

The core 740 can include one or more Central Processing Units (CPU) 741, Graphics Processing Units (GPU) 742, specialized programmable processing units in the form of Field Programmable Gate Areas (FPGA) 743, hardware accelerators for certain tasks (744), graphics adapters 750, and so forth. These devices, along with Read-only memory (ROM) 745, Random-access memory 746, internal mass storage such as internal non-user accessible hard drives, SSDs, and the like 747, may be connected through a system bus 748. In some computer systems, the system bus 748 can be accessible in the form of one or more physical plugs to enable extensions by additional CPUs, GPU, and the like. The peripheral devices can be attached either directly to the system bus 748, or through a peripheral bus 749. In an example, the screen 710 can be connected to the graphics adapter 750. Architectures for a peripheral bus include PCI, USB, and the like.

CPUs 741, GPUs 742, FPGAs 743, and accelerators 744 can execute certain instructions that, in combination, can make up the aforementioned computer code. That computer code can be stored in ROM 745 or RAM 746. Transitional data can also be stored in RAM 746, whereas permanent data can be stored for example, in the internal mass storage 747. Fast storage and retrieve to any of the memory devices can be enabled through the use of cache memory, that can be closely associated with one or more CPU 741, GPU 742, mass storage 747, ROM 745, RAM 746, and the like.

The computer readable media can have computer code thereon for performing various computer-implemented operations. The media and computer code can be those specially designed and constructed for the purposes of the present disclosure, or they can be of the kind well known and available to those having skill in the computer software arts.

As an example and not by way of limitation, the computer system having architecture 700, and specifically the core 740 can provide functionality as a result of processor(s) (including CPUs, GPUs, FPGA, accelerators, and the like) executing software embodied in one or more tangible, computer-readable media. Such computer-readable media can be media associated with user-accessible mass storage as introduced above, as well as certain storage of the core 740 that are of non-transitory nature, such as core-internal mass storage 747 or ROM 745. The software implementing various embodiments of the present disclosure can be stored in such devices and executed by core 740. A computer-readable medium can include one or more memory devices or chips, according to particular needs. The software can cause the core 740 and specifically the processors therein (including CPU, GPU, FPGA, and the like) to execute particular processes or particular parts of particular processes described herein, including defining data structures stored in RAM 746 and modifying such data structures according to the processes defined by the software. In addition or as an alternative, the computer system can provide functionality as a result of logic hardwired or otherwise embodied in a circuit (for example: accelerator 744), which can operate in place of or together with software to execute particular processes or particular parts of particular processes described herein. Reference to software can encompass logic, and vice versa, where appropriate. Reference to a computer-readable media can encompass a circuit (such as an integrated circuit (IC)) storing software for execution, a circuit embodying logic for execution, or both, where appropriate. The present disclosure encompasses any suitable combination of hardware and software.

Figure 8:
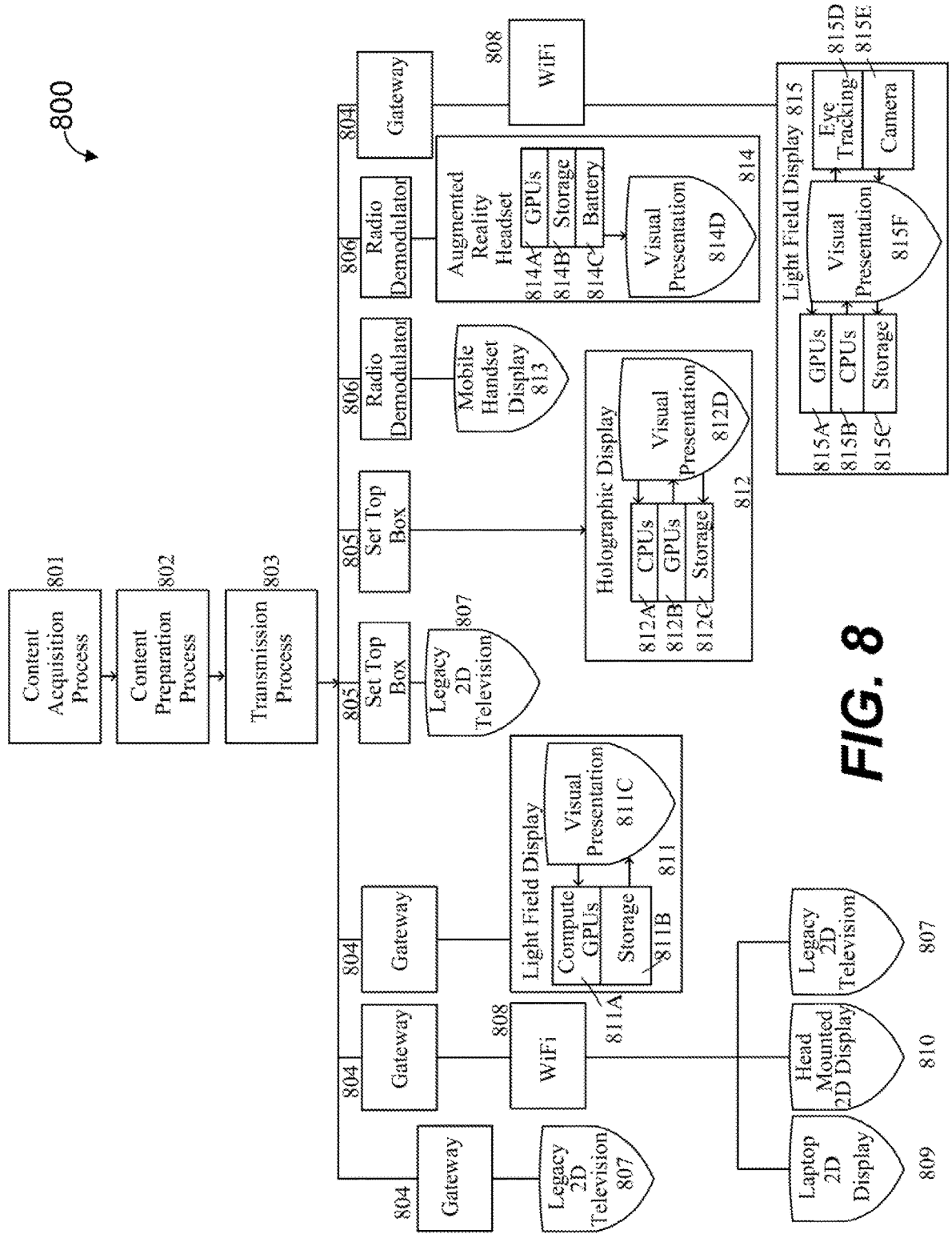
FIG. 8 shows a network media distribution system in some examples.

FIG. 8 shows a network media distribution system 800 that supports a variety of legacy and heterogenous immersive-media capable displays as client end-points in some examples. In the FIG. 8 example, content acquisition module 801 captures or creates the media using example embodiments in FIG. 6 or FIG. 5. Ingest formats are created in content preparation module 802 and then are transmitted to one or more client end-points in a network media distribution system using transmission module 803. Gateways 804 may serve customer premise equipment to provide network access to various client end-points for the network. Set top boxes 805 may also serve as customer premise equipment to provide access to aggregated content by the network service provider. Radio demodulators 806 may serve as mobile network access points for mobile devices (e.g., as with mobile handset and displays 813). In one or more embodiments, legacy 2D televisions 807 may be directly connected to gateways 804, set-top boxes 805, or WiFi routers 808. A computer laptop with a legacy 2D display 809 may be a client end-point connected to a WiFi router 808. A head mounted 2D (raster-based) display 810 may also connected to a router 808. A Lenticular light field display 811 may be connected to a gateway 804. The display 811 may be comprised of local compute GPUs 811A, storage devices 811B, and a visual presentation unit 811C that creates multiple views using a ray-based lenticular optical technology. A Holographic Display 812 may be connected to a set top box 805 and may include local compute CPUs 812A, GPUs 812B, storage devices 812C, and a Fresnal pattern, wave-based holographic visualization unit 812D. An augmented reality headset 814 may be connected to a radio demodulator 806 and may include a GPU 814A, a storage device 814B, a battery 814C, and a volumetric visual presentation component 814D. A dense light field display 815 may be connected to a WiFi router 808 and may include multiple GPUs 815A, CPUs 815B, and storage devices 815C; an eye tracking device 815D; a camera 815E; and a dense ray-based light field panel 815F.

Figure 9:
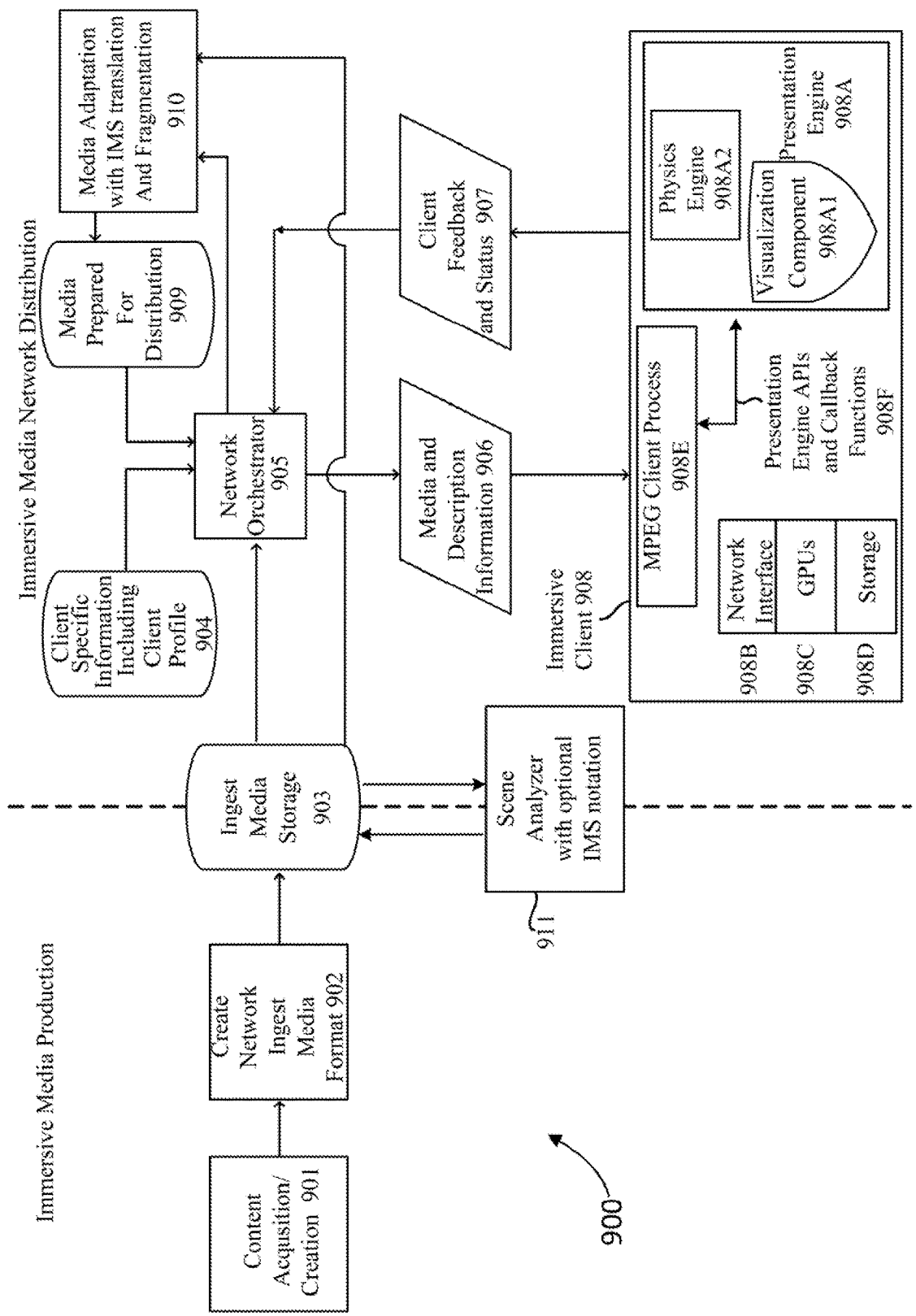
FIG. 9 shows a diagram of an immersive media distribution module in some examples.

FIG. 9 shows a diagram of an immersive media distribution module 900 that is capable of serving legacy and heterogenous immersive media-capable displays as previously depicted in FIG. 8. Content is either created or acquired in module 901, which is embodied in FIG. 5 and FIG. 6 for natural and CGI content respectively. Content is then converted into an ingest format using the create network ingest format module 902. Some examples of the module 902 are embodied in FIG. 5. and FIG. 6 for natural and CGI content respectively. The ingest media is optionally annotated with IMS metadata by Scene Analyzer with Optional IMS Notation 911. The ingest media format is transmitted to the network and stored on storage device 903. In some other examples, the storage device may reside in the immersive media content producer's network, and accessed remotely by the immersive media network distribution module 900 as depicted by the dashed line that bisects. Client and application specific information is, in some examples, available on a remote storage device 904, which may optionally exist remotely in an alternate cloud network in an example.

As depicted in FIG. 9, a network orchestrator (or process) 905 serves as the primary source and sink of information to execute the major tasks of the distribution network. In the embodiment of FIG. 9, the network orchestrator 905 may be implemented in unified format with other components of the network. Nevertheless, the tasks depicted by network orchestrator 905 in FIG. 9 form elements of the disclosed subject matter in some examples. Orchestration process 905 may further employ a bi-directional message protocol with the client to facilitate all processing and distribution of the media in accordance with the characteristics of the client. Furthermore, the bi-directional protocol may be implemented across different delivery channels, such as a control plane channel and a data plane channel.

The process 905 can receives information about the features and attributes of client 908, and furthermore collects requirements regarding the application currently running on 908. This information may be obtained from a device 904, or in an alternate embodiment, may be obtained by directly querying the client 908. In the case of a direct query to client 908, a bi-directional protocol (not shown in FIG. 9) is assumed to be present and operational so that the client may communicate directly to the orchestration process 905.

Figure 10:
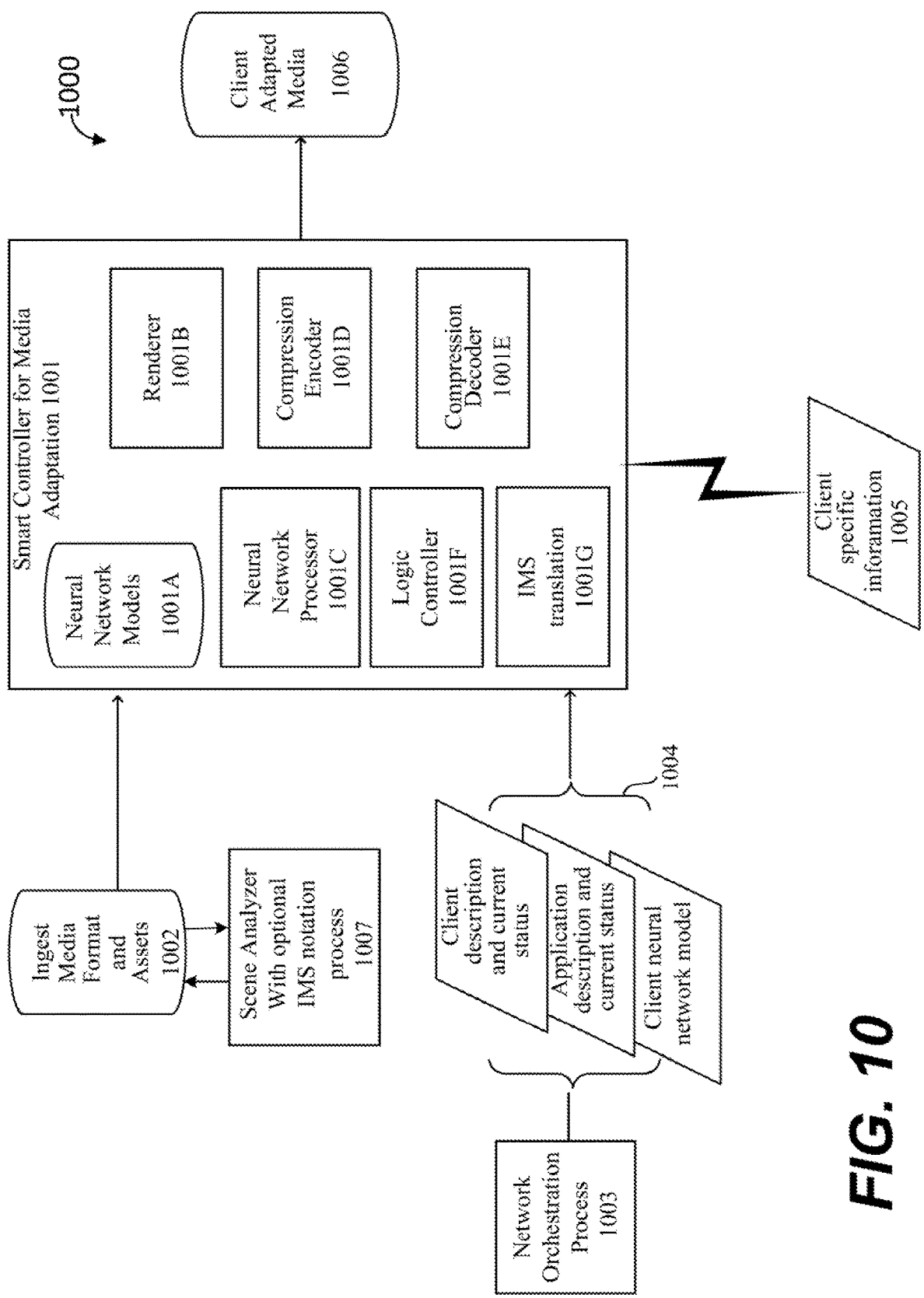
FIG. 10 shows a diagram of a media adaptation process in some examples.

Orchestration process 905 also initiates and communicates with media adaptation and fragmentation process 910 which is described in FIG. 10. As ingested media is adapted and fragmented by the process 910, the media is optionally transferred to an *intermedia* storage device depicted as the media prepared for distribution storage device 909. As the distribution media is prepared and stored in device 909, orchestration process 905 can ensure that an immersive client 908, via a network interface 908B, either receives the distribution media. Corresponding descriptive information 906, either through a "push" request or the client 908 itself, may initiate a "pull" request of the media 906 from a storage device 909. Orchestration process 905 may employ a bi-directional message interface (not shown in FIG. 9) to perform the "push" request or to initiate a "pull" request by the client 908. The immersive client 908 may optionally employ GPUs (or CPUs not shown) 908C. The distribution format of the media is stored in the storage device or storage cache 908D of the client 908. Finally, the client 908 visually presents the media via a visualization component 908A.

Throughout the process of streaming the immersive media to the client 908, the orchestration process 905 can monitor the status of the client's progress via client progress and status feedback channel 907. The monitoring of status may be performed by means of a bi-directional communication message interface (not shown in FIG. 9).

FIG. 10 depicts a diagram of a media adaptation process 1000 so that the ingested source media may be appropriately adapted to match the requirements of the immersive client 908 in some examples. A media adaptation process 1001 is comprised of multiple components that facilitate the adaptation of the ingest media into an appropriate distribution format for immersive client 908. In FIG. 10, the media adaptation process 1001 receives input network status (e.g., client specific information) 1005 to track the current traffic load on the network. The immersive client 908 information can include attributes and features description, application features and description as well as application current status, and a client neural network model (if available) to aid in mapping the geometry of the client's frustum to the interpolation capabilities of the ingest immersive media. Such information may be obtained by means of a bi-directional message interface (not shown in FIG. 10) with the aid of a smart client interface shown as 908E in FIG. 9. The media adaptation process 1001 ensures that the adapted output, as it is created, is stored into a client-adapted media storage device 1006. A media reuse analyzer 1007 is depicted in FIG. 10 as a process that may be executed a priori or as part of the network automated process for the distribution of the media.

In some examples, the media adaptation process 1001 is controlled by a logic controller 1001F. In an example, the media adaptation and fragmentation module 1001 employs a renderer 1001B or a neural network processor 1001C to adapt the specific ingest source media to a format that is suitable for the client. In an example, the media adaptation and fragmentation module 1001 receives client information 1004 from a client interface module 1003, such as a server device in an example. The client information 1004 can include client description and current status, can application description and the current status, and can include client neural network model. The neural network processor 1001C uses neural network models 1001A. Examples of such a neural network processor 1001C include the deepview neural network model generator as described in MPI and MSI. In some examples, the media is in a 2D format, but the client requires a 3D format, then the neural network processor 1001C can invoke a process to use highly correlated images from a 2D video signal to derive a volumetric representation of the scene depicted in the video. An example of such a process could be the neural radiance fields from one or few images process developed at the University of California, Berkley. An example of a suitable renderer 1001B could be a modified version of the OTOY Octane renderer (not shown) which would be modified to interact directly with the media adaptation process 1001. The media adaptation process 1001 may, in some examples, employ media compressors 1001D and media decompressors 1001E depending on the need for these tools with respect to the format of the ingest media and the format required by immersive client 908.

Figure 11:
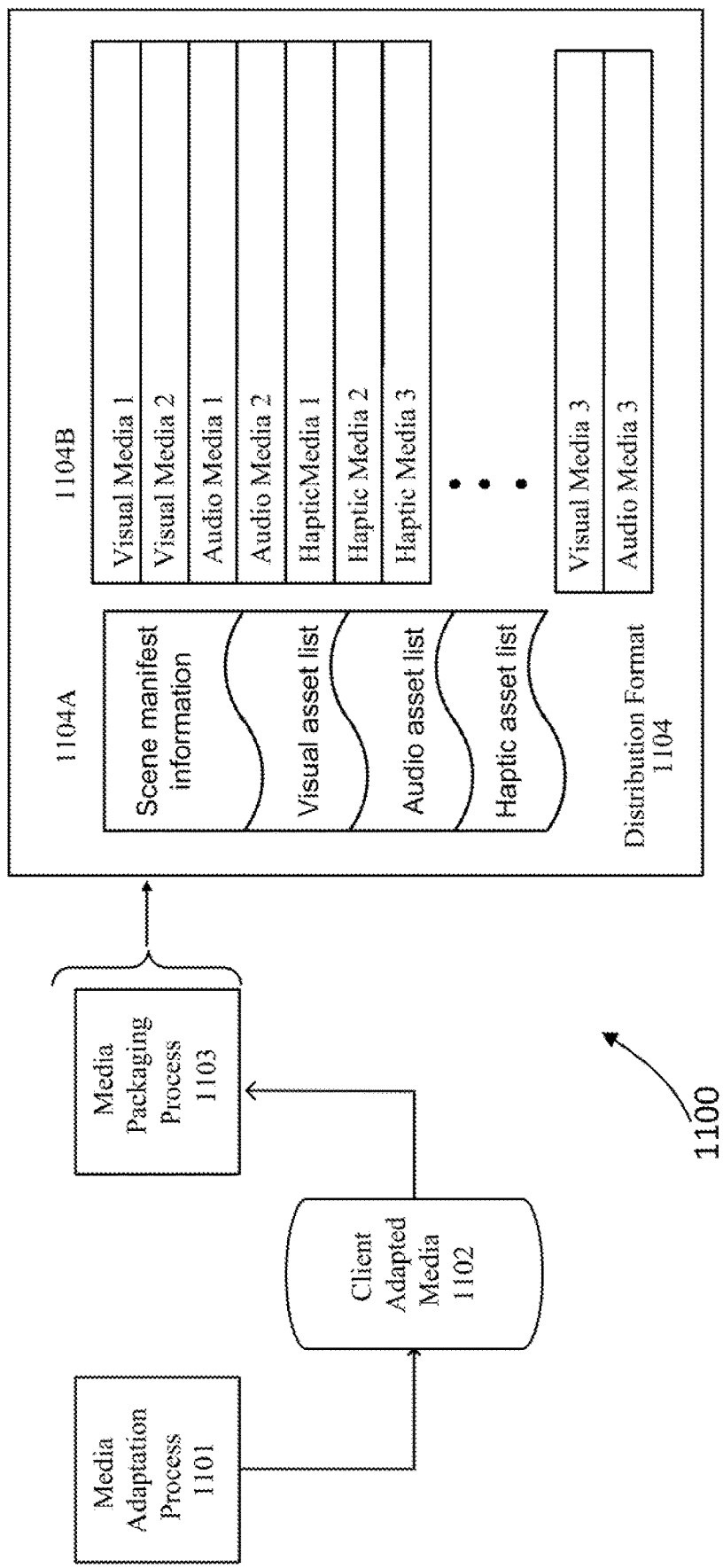
FIG. 11 depicts a distribution format creation process in some examples.

FIG. 11 depicts a distribution format creation process 1100 in some examples. An adapted media packaging process 1103 packages media from media adaptation process 1101 (depicted as process 1000 in FIG. 10) now residing on client adapted media storage device 1102. The packaging process 1103 formats the adapted media from media adaptation process 1101 into a robust distribution format 1104, for example, the exemplary formats shown in FIG. 3 or FIG. 4. Manifest information 1104A provides client 908 with a list of scene data assets 1104B that it can expect to receive as well as optional metadata describing the frequency by each asset is used across the set of scenes comprising the presentation. List 1104B depicts a list of visual assets, audio assets, and haptic assets, each with their corresponding metadata. In this exemplary embodiment, each of the assets in list 1104B references metadata that contains a numeric frequency value that indicates the number of times that a particular asset is used across all scenes that comprise the presentation.

Figure 12:
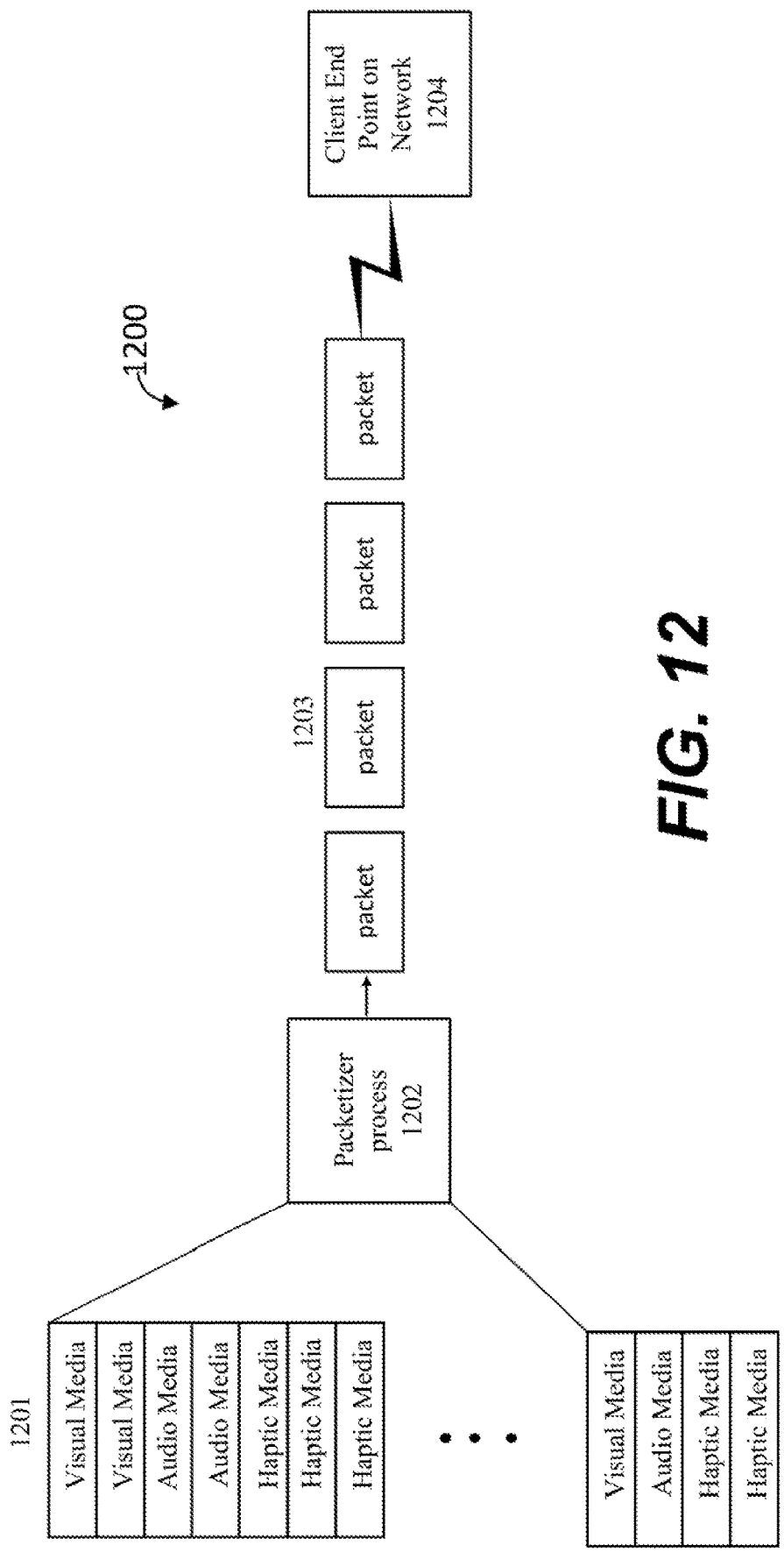
FIG. 12 shows a packetizer process system in some examples.

FIG. 12 shows a packetizer process system 1200 in some examples. In the FIG. 12 example, a packetizer process 1202 separates the adapted media 1201 into individual packets 1203 that are suitable for streaming to the immersive client 908, shown as client end point 1204 on network.

Figure 13:
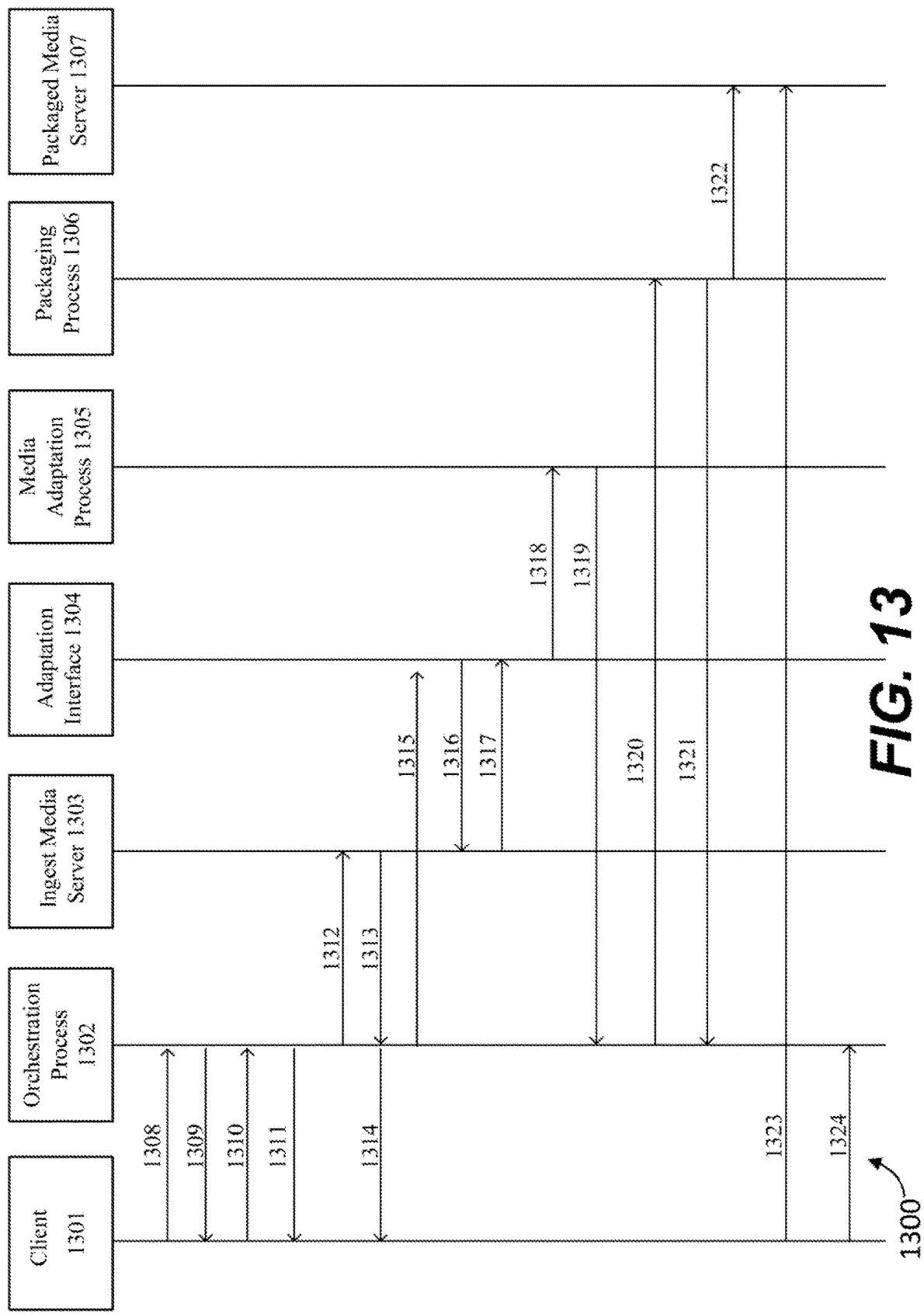
FIG. 13 shows a sequence diagram of a network adapting a specific immersive media in some examples

FIG. 13 shows a sequence diagram 1300 of a network adapting a specific immersive media in an ingest format to a streamable and suitable distribution format for a specific immersive media client end-point in some examples.

The components and communications shown in FIG. 13 are explained as follows: client 1301 (also referred to as client end-point, client device, in some examples) initiates a media request 1308 to a network orchestrator 1302 (also referred to as network distribution interface in some examples). The media request 1308 includes information to identify the media that is requested by the client 1301, either by URN or other standard nomenclature. The network orchestrator 1302 responds to media request 1308 with profiles request 1309, which requests that client 1301 provide information about its currently available resources (including compute, storage, percent battery charged, and other information to characterize the current operating status of the client). The profiles request 1309 also requests that the client provide one or more neural network models that can be used by the network for neural network inferencing to extract or interpolate the correct media views to match the features of the client's presentation system if such models are available at the client. Response 1310 from client 1301 to the network orchestrator 1302 provides a client token, application token, and one or more neural network model tokens (if such neural network model tokens are available at the client). The network orchestrator 1302 then provides client 1301 with a session ID token 1311. The network orchestrator 1302 then requests ingest media server 1303 with ingest media request 1312, which includes the URN or standard nomenclature name for the media identified in request 1308. The ingest media server 1303 replies to the request 1312 with a response 1313 which includes an ingest media token. The network orchestrator 1302 then provides the media token from the response 1313 in a call 1314 to client 1301. The network orchestrator 1302 then initiates the adaptation process for the media request 1308 by providing the adaptation interface 1304 with the ingest media token, client token, application token, and neural network model tokens 1315. The adaptation interface 1304 requests access to the ingest media by providing the ingest media server 1303 with the ingest media token at call 1316 to request access to the ingest media assets. The ingest media server 1303 responds to request 1316 with an ingest media access token in response 1317 to the adaptation interface 1304. The adaptation interface 1304 then requests that media adaptation module 1305 adapt the ingest media located at the ingest media access token for the client, application, and neural network inference models corresponding to the session ID token created at 1313. Request 1318 from the adaptation interface 1304 to media adaptation module 1305 contains the required tokens and session ID. The media adaptation module 1305 provides the network orchestrator 1302 with adapted media access token and session ID in update 1319. The network orchestrator 1302 provides the packaging module 1306 with adapted media access token and session ID in interface call 1320. The packaging module 1306 provides response 1321 to the network orchestrator 1302 with the packaged media access token and session ID in response message 1321. The packaging module 1306 provides packaged assets, URNs, and the packaged media access token for the session ID to the packaged media server 1307 in response 1322. Client 1301 executes request 1323 to initiate the streaming of media assets corresponding to the packaged media access token received in response message 1321. The client 1301 executes other requests and provides status updates in message 1324 to the network orchestrator 1302.

According to first aspects of the present disclosure, a format translation can be provided based on tables (e.g., lookup tables) that "bind" a scene graph format to portions of the IMS that are relevant to a particular scene graph format. Thus, in the presence of multiple binding tables, such as the IMS for a scene graph in a format A and the IMS for the scene graph in a format B, a translation process can output a scene graph in the format B from the scene graph in the format A, where the scene graph in the format A can be provided as an input to the format translation process.

Figure 14:
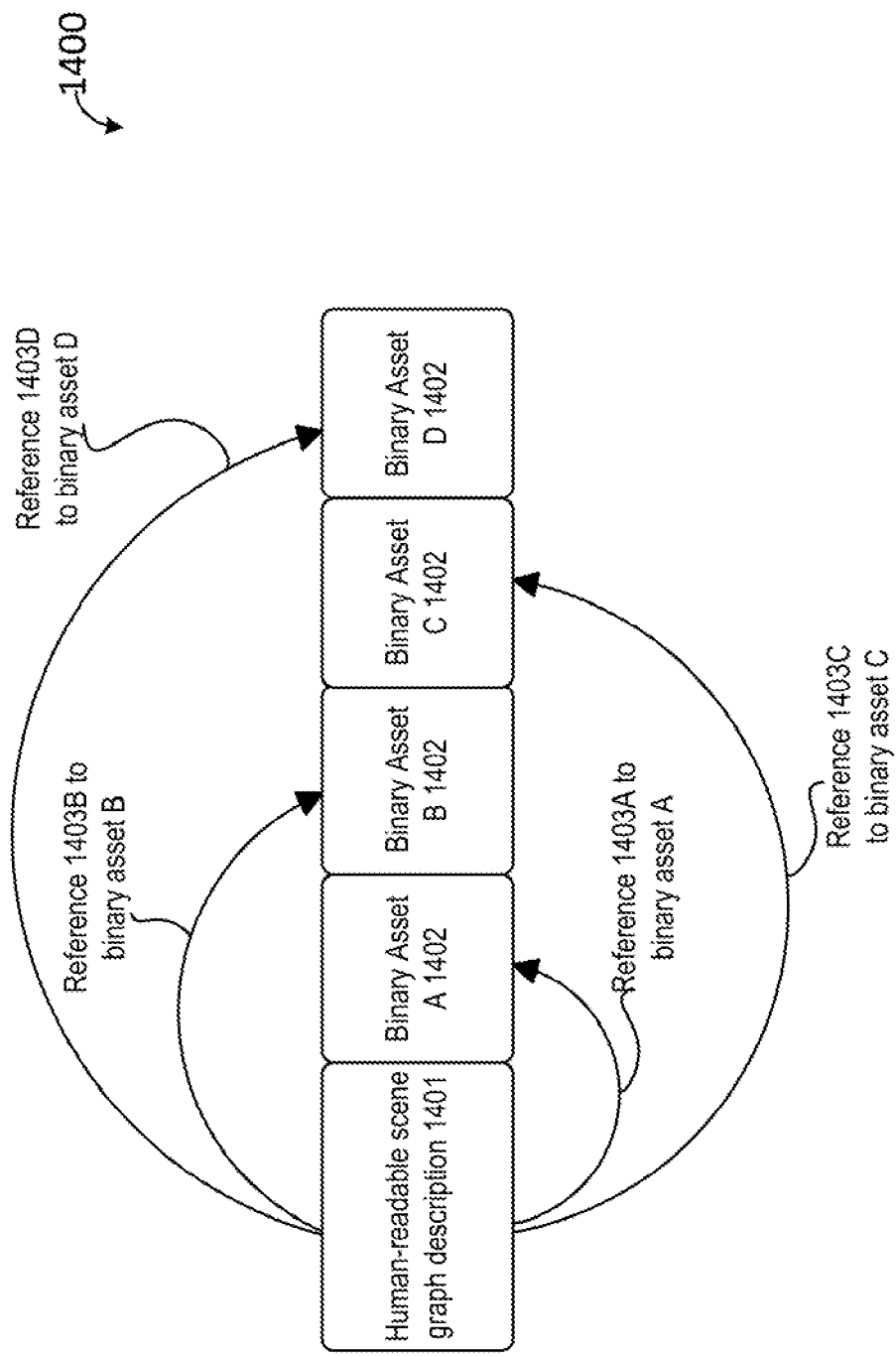
FIG. 14 shows a diagram of an exemplary architecture for scene graphs in some examples.

FIG. 14 is an exemplary scene graph architecture (or scene graph) 1400. As shown in FIG. 14, the scene graph 1400 can include a human-readable scene graph description (or description) 1401 and a plurality of binary assets 1402. The description 1401 can be configured to store spatial, logical, physical, and/or temporal aspects of the binary assets 1402. The plurality of binary assets 1402 can be associated with the description 1401. For example, the description 1401 can contain references 1403 associated with the binary assets 1402. The references 1403 can provide addresses and descriptions (e.g., attributes) of the binary assets 1402. In an example of FIG. 14, four binary assets 1402 are provided: a binary asset A 1402, a binary asset B 1402, a binary asset C 1402, and a binary asset D 1402. Accordingly, the references 1403 from the description 1401 can include references 1403A-1403D. The reference 1403A can be associated with the binary asset A 1402, the reference 1403B can be associated with the binary asset B 1402, the reference 1403C can be associated with the binary asset C 1402, and the reference 1403D can be associated with the binary asset D 1402.

In an example of the scene graph 1400, the scene graph can include a scene (e.g., a forest). The scene can include a plurality of objects (e.g., trees). Each object can include one or more assets (e.g., trunks, branches, and leaves). When an object includes one asset, the object and the asset corresponding to the object are identical.

Figure 15:
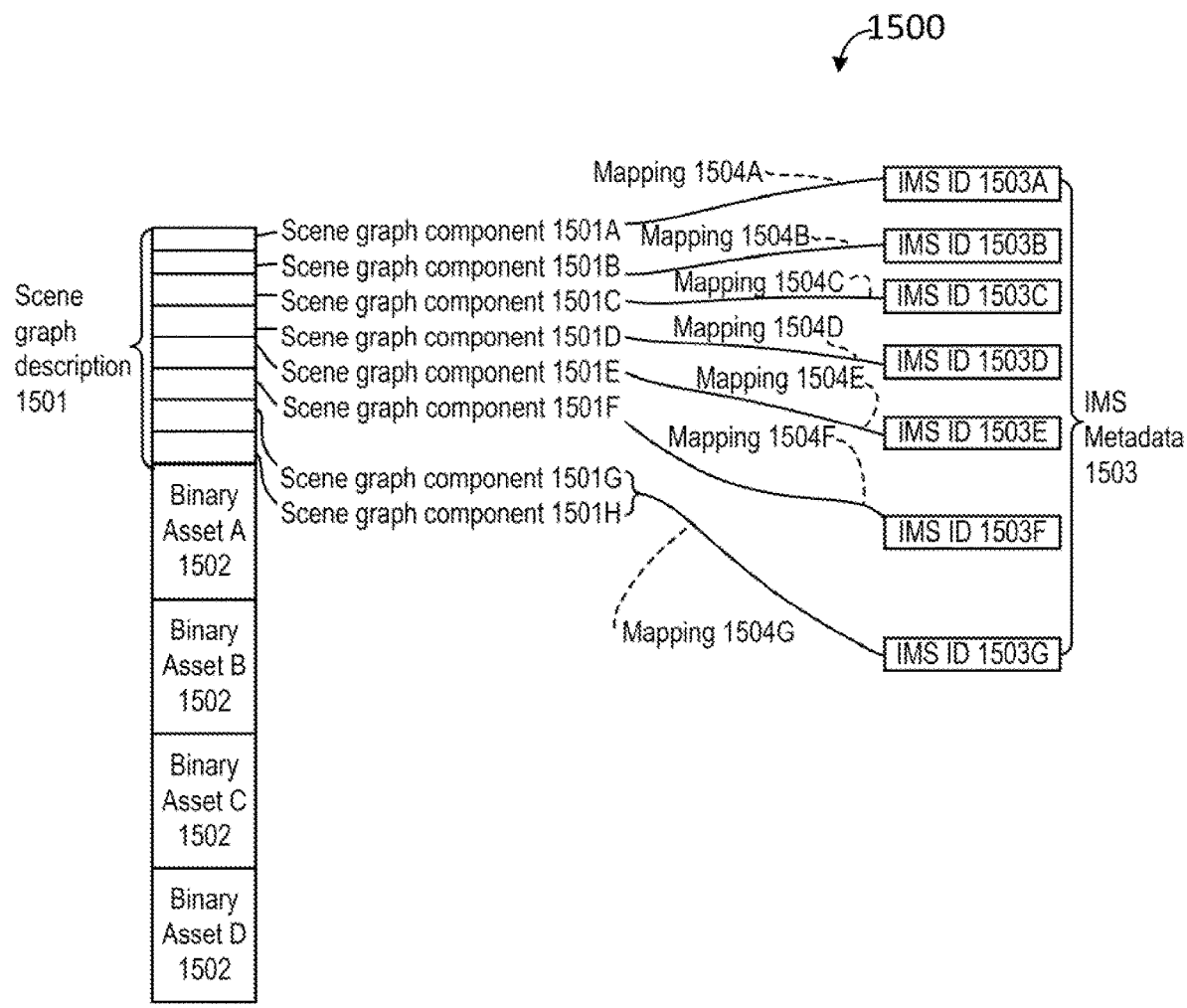
FIG. 15 is a schematic illustration of an exemplary annotated scene graph in some examples.

FIG. 15 is an exemplary scene graph architecture that is annotated with metadata, such as IMS metadata, to create an IMS-annotated scene graph architecture (or architecture) 1500. The architecture can include a scene graph and IMS metadata 1503. The IMS metadata 503 can be indicated by a plurality of IMS IDs (e.g., 1503A-1503G). The scene graph can include a human-readable scene graph description (or description) 1501 and a plurality of binary assets 1502. The IMS metadata 1503 can provide a nomenclature that can be used to describe commonly-used aspects across multiple scene graph formats. Thus, the IMS metadata 1503 can provide a guidance of a format translation from one format to another format and a distribution of a media network. In an embodiment, the structure and organization of the architecture 1500 can be similar to the scene graph architecture 1400 in FIG. 14.

Still referring to FIG. 15, the description 1501 can include a plurality of scene graph components 1501A-1501H. Each of the plurality of components 1501A-1501H can be configured to describe some part of physical, logical, spatial, or temporal aspects of the binary assets 1502. For example, each of the components 1501A-1501H can describe a respective attribute (e.g., the physical, logical, spatial, or temporal aspects) of the binary assets 1502. The binary assets 1502 in the architecture 1500 can include a binary asset A 1502, a binary asset B 1502, a binary asset C 1502, and a binary asset D 1502. The description 1501 can include a scene graph component 1501A, a scene graph component 1501B, a scene graph component 1501C, a scene graph component 1501D, a scene graph component 1501E, a scene graph component 1501F, a scene graph component 1501G, and a scene graph component 1501H. Annotations of the scene graph components 1501 with (or based on) the IMS metadata 1503 can be implemented by mappings 1504. The mappings 1504 can be obtained (or determined) from a binding lookup table (LUT) for the scene graph architecture 1500. An exemplary binding LUT can be shown in FIG. 16. As shown in FIG. 15, mapping 1504A can logically link the scene graph component 1501A with the IMS metadata ID 1503A. Mapping 1504B can logically link the scene graph component 1501B with the IMS metadata ID (or IMS ID) 1503B. Mapping 1504C can logically link the scene graph component 1501C with the IMS metadata ID 1503C. Mapping 1504D can logically link the scene graph component 1501D with the IMS metadata ID 1503D. Mapping 1504E can logically link the scene graph component 1501E with the IMS metadata ID 1503E. Mapping 1504F can logically link the scene graph component 1501F with the IMS metadata ID 1503F. Mapping 1504G can logically link both the scene graph components 1501G and 1501H with the IMS metadata ID 1503G. Each of the IMS metadata IDs 1503A-1503G can indicate respective metadata. The metadata indicated by the IMS metadata IDs can be configured to guide a translation from a format A to a format B for the scene graph in the architecture 1500.

Figure 16:
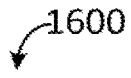
FIG. 16 is a schematic illustration of an exemplar independent mapping space (IMS) binding lookup table in some examples.

FIG. 16 shows an exemplary IMS lookup table (LUT) 1600 that "binds" a particular scene graph format A to metadata identifiers (IDs) that indicate the IMS (or IMS metadata. The table 1600 serves as a reference to a translation process (not depicted in FIG. 16) to guide a translation of any scene graph created using a format A (e.g., glTF, glTF prime, or ITMF) to another scene graph format, such as a scene graph expressed in format B (e.g., glTF, glTF prime, or ITMF). Within the table 1600, components (or scene graph component) 1601 of a scene graph in the format A can be provided in a first column from a left side of the table. The components 1601 can include 1601A, 1601B, 1601C, 1601D, 1601E, 1601F, 1601G, 1601H, 1601I, 1601J, 1601K, 1601L, 1601M, and 1601N. Each component can represent a particular syntax of a scene graph expressed in the format A, such as nodes, node connections, groups of nodes, lighting, surface properties, etc. Thus, each component indicates a respective attribute of the scene graph expressed in the format A. The mapping of the components 1601 to the IMS metadata identifiers (IDs) 1602, 1603, and 1604 can be a one-to-one mapping, a one-to-many mapping, or a many-to-many mapping. For example, the component 1601A can map to two sets of metadata IDs from the IMS, such as 1602A and 1603A. Likewise, the component 1601B can map to metadata IDs 1602B and 1603B. The component 1601C may require three IMS metadata identifiers for description, such as 1602C, 1603C, and 1604A. Similarly, the component 1601D can map (or link) three IMS identifiers 1602D, 1603D, and 1604B. The component 1601E can map (or link) IMS identifiers 1602E, 1603E, and 1604C. The component 1601F can be described by two IMS identifiers 1602F and 1603F. Both the components 1601G and 1601H can be linked with a same IMS identifier 1604D. In addition, the component 1601G may require additional identifiers 1602G and 1603G. The component 1601H may require additional identifiers 1602H and 1603H. Both the components 1601I and 1601J can be described based on two IMS identifiers. For example, the component 1601I can be described by IMS IDs 1602I and 1603I, and the component 1601J can be described by IMS IDs 1602J and 1603J, respectively. The components 1601K and 1601L can be described based on a single IMS identifier. For example, the component 1601K can be described based on 1602K and the component 1601L can be described based on 1602L respectively. The components 1601M and 1601N can be described based on a same IMS identifier 1602J.

Figure 17:
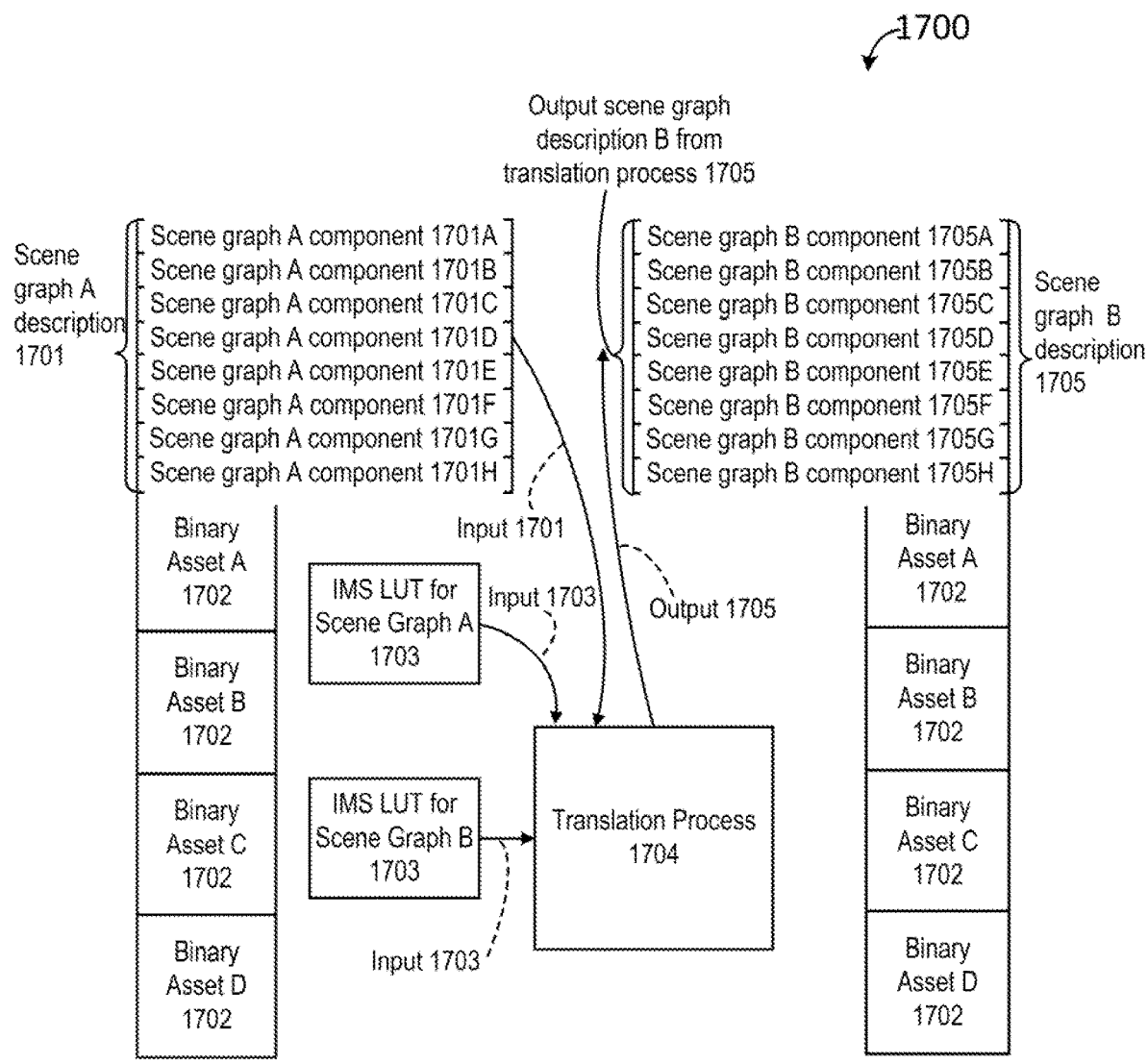
FIG. 17 is a schematic illustration of a scene graph translation process according to some embodiments of the disclosure.

FIG. 17 shows an exemplary illustration of a scene graph translation system (or system) 1700. As shown in FIG. 17, the system 1700 can include a translation process executor (or executor) 1704. In an example, the executor 1704 can be an encoder. In an example, the executor 1704 can include processing circuitry. The executor 1704 can receive inputs that include a description 1701 for a scene graph format A (e.g., description for a scene graph in the format A), IMS LUT 1703 for the scene graph format A (functions as a source format for the translation process), and IMS LUT 1703 for a scene graph format B (functions as a target format for the translation process). The scene graph included in the system 1700 can include a plurality of binary assets 1702. The IMS LUT 1703 for the scene graph format A can include IMS IDs in the LUT that are associated with the description for the scene graph in the format A. The IMS LUT 1703 for the scene graph format B can include IMS IDs in the LUT that are associated with the description for the scene graph in the format B. The description for scene graph A (or the description for the scene graph in the format A) 1701 can contain (or include) a plurality of scene graph A components 1701A, 1701B, 1701C, 1701D, 1701E, 1701F, 1701G, and 1701H. Each of the scene graph A components can indicate (or describe) a respective attribute of the scene graph. Executor 1704 can be guided by the scene graph A description 1701, the IMS LUT 1703 for the scene graph format A, and the IMS LUT 1703 for the scene graph format B to create an output description for the scene graph format B (e.g., a description for the scene graph in the format B) 1705. The description for the scene graph format B 1705 can include components 1705A, 1705B, 1705C, 1705D, 1705E, 1705F, 1705G, and 1705H. Each of the components 1705A, 1705B, 1705C, 1705D, 1705E, 1705F, 1705G, and 1705H can indicate (or describe) a respective attribute of the scene graph. The scene graph can further be rendered based on the description for the scene graph format B 1705. Thus, based on the system 1700, the scene graph can be translated from the format A to the format B. It should be noted that the binary asset A 1702, binary asset B 1702, binary asset C 1702, and binary asset D 1702 of the scene graph may not be impacted by the translation process executor 1704.

Thus, as shown in FIG. 17, based on the description for the scene graph in the format A 1701 and the IMS LUT 1703 associated with the scene graph in the format A, the executor 1704 can identify a correlation between the description for the scene graph in the format A and the IMS ID associated with the scene graph in the format A. Further, based on the correlation of the IMS IDs associated with the scene graph in the format A and the IMS IDs associated with the scene graph in the format B, the executor 1704 can identify the description for the scene graph in the format B because the IMS IDs associated with the scene graph in the format B are correlated with the description for the scene graph in the format B. Accordingly, the scene graph can be rendered (or described) in the format B.

In an embodiment of the format translation process provided in FIG. 17, the format A can be one of a graphics language transmission format (glTF), a glTF prime, a glTF extension, an immersive technologies media format (ITMF), a universal scene description, and a first renderer. The format B can be different from the format A. The format B can be one of the glTF, the glTF prime, the glTF extension, the ITMF, the universal scene description, and a second renders.

Figure 18:
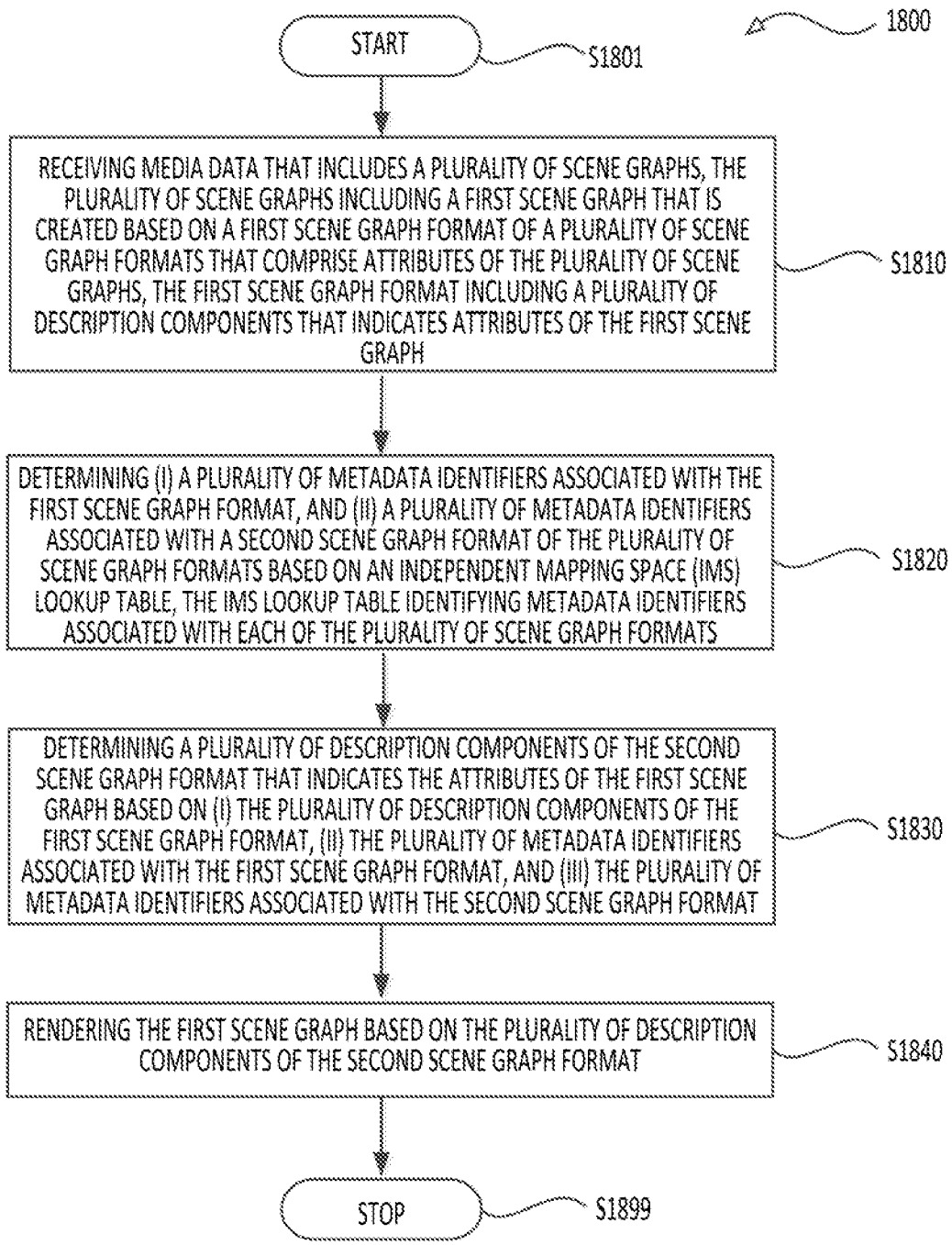
FIG. 18 shows a flow chart outlining a scene translation process according to some embodiments of the disclosure.

FIG. 18 shows a flow chart outlining a process 1800 according to an embodiment of the disclosure. The process 1800 can be executed in an electronic device, such as a client device with a smart client for interfacing the client device with a network. In some embodiments, the process 1800 is implemented in software instructions, thus when processing circuitry executes the software instructions, the processing circuitry performs the process 1800. For example, the smart client is implemented in software instructions, the software instructions can be executed by processing circuitry to perform a smart client process that can include the process 1800. The process starts at S1801, and proceeds to S1810.

At S1810, media data that includes a plurality of scene graphs is received. The plurality of scene graphs includes a first scene graph that is created based on a first scene graph format of a plurality of scene graph formats. The plurality of scene graph formats comprises attributes of the plurality of scene graphs. The first scene graph format includes a plurality of description components that indicates attributes of the first scene graph.

At S1820, a plurality of metadata identifiers associated with the first scene graph format and a plurality of metadata identifiers associated with a second scene graph format of the plurality of scene graph formats are determined based on an independent mapping space (IMS) lookup table, where the IMS lookup table identifies metadata identifiers associated with each of the plurality of scene graph formats.

At S1830, a plurality of description components of the second scene graph format that indicates the attributes of the first scene graph is determined based on (i) the plurality of description components of the first scene graph format, (ii) the plurality of metadata identifiers associated with the first scene graph format, and (iii) the plurality of metadata identifiers associated with the second scene graph format.

At S1840, the first scene graph is rendered based on the plurality of description components of the second scene graph format.

In some embodiments, the attributes of the first scene graph include at least one of a logical attribute, a physical attribute, a temporal attribute, or a spatial attribute.

In some embodiments, each of the plurality of description components of the first scene graph format indicates a respective one of the attributes of the first scene graph.

In an example, each of the plurality of description components of the first scene graph format is associated with one or more metadata identifiers of the plurality of metadata identifiers that are associated with the first scene graph format. In an example, each of the plurality of description components of the second scene graph format is associated with one or more metadata identifiers of the plurality of metadata identifiers that are associated with the second scene graph format.

In an example, the first scene graph format is one of a Graphics Language Transmission Format (glTF), a glTF prime, an Immersive Technologies Media Format (ITMF), a Universal Scene Description, and a first renderer. In an example, the second scene graph format is one of the glTF, the glTF prime, the ITMF, the Universal Scene Description, and a second renderer, where the second scene graph format is different from the first scene graph format.

In an example, the plurality of metadata identifiers associated with the first format is specified in ISO/IEC 28090 Part 28.

In some embodiments, the first scene graph includes a plurality of binary assets, each of the plurality of binary assets indicating a respective element of an object included in the first scene graph.

In an example, the attributes of each of the plurality of binary assets of the first scene graph are indicated by the plurality of description components of the first scene graph format.

In some embodiment, a first description component and a second description component of the plurality of description components of the first scene graph format are associated with a same metadata identifier of the plurality of metadata identifiers associated with the first scene graph format.

In some embodiments, the attributes of each of the plurality of binary assets of the first scene graph are indicated by the plurality of description components of the second scene graph format.

Then, the process 1800 proceeds to S1899 and terminates.

The process 1800 can be suitably adapted to various scenarios and steps in the process 1800 can be adjusted accordingly. One or more of the steps in the process 1800 can be adapted, omitted, repeated, and/or combined. Any suitable order can be used to implement the process 1800. Additional step(s) can be added.

According to second aspects of the disclosure, a format translation can by implemented by mapping standardized metadata, such as metadata described in ISO/IEC 23090 Part 28, to individual components for a specific instance of a scene graph. The scene graph can be represented according to the syntax of the ITMF, as specified by the Immersive Digital Experiences Alliance. The techniques of the disclosure can provide format translations of scene graphs, from one format to another.

Figure 19:
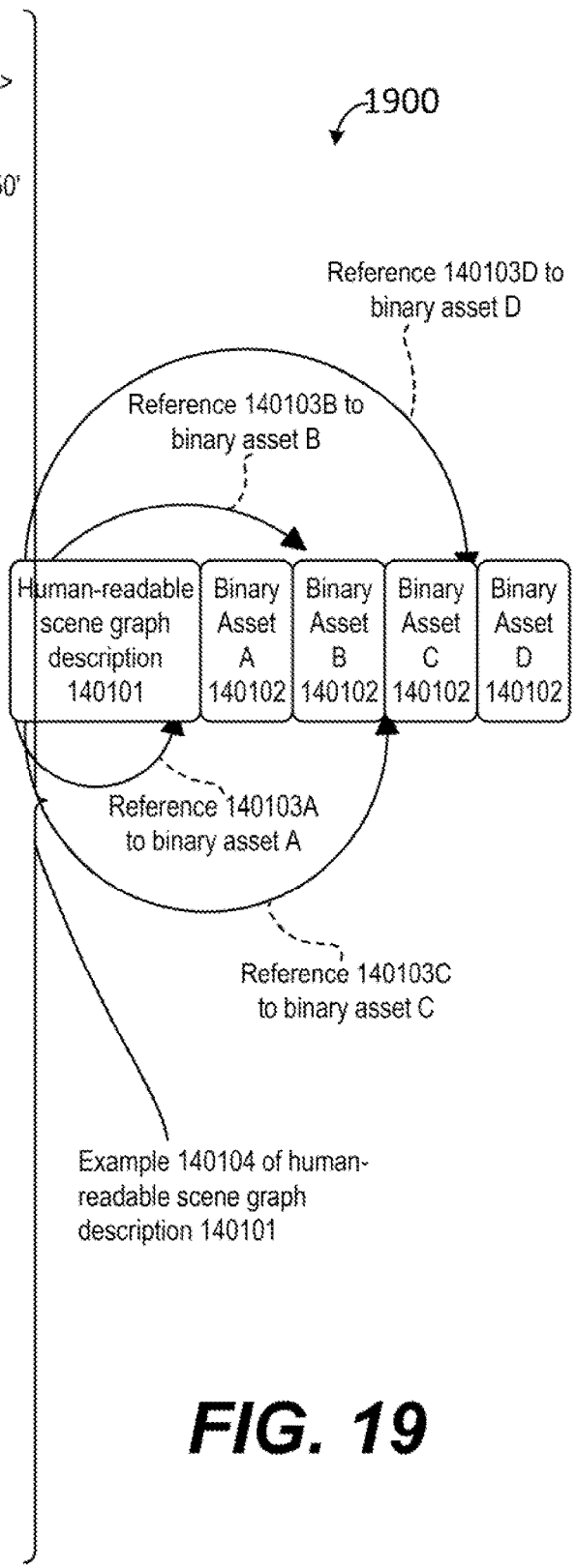
FIG. 19 is a schematic illustration of an expanded example of a scene graph architecture based on immersive technologies media format (ITMF).

FIG. 19 shows an expanded example 1900 of the general scene graph architecture 1400 depicted in FIG. 14 using ITMF OCS of an ITMF scene graph (e.g., a scene graph is created or described based on ITMF). OCS can be a human-readable portion of the ITMF scene graph that uses unique identifiers denoted as 'id=nnn', where 'nnn' is an integer value. The scene graph shown in FIG. 19 can include a human-readable scene graph description (or description) 140101 and a plurality of binary assets 140102. An example 140104 of the human-readable scene graph description 140101 shows that each of the salient portions (e.g., attributes of the scene graph) of the ITMF OCS is associated with a unique identifier shown as 'id=nnn', where 'nnn' is an integer. The description 140101 can serve as a portion of the scene graph where spatial, logical, physical, and temporal aspects of the associated binary assets 142102 are stored. The description 140101 shown in FIG. 19 can also contain (or include) references 140103 to the binary assets 140102. For simplicity and clarity, the binary assets 142102 are not depicted in the exemplary human-readable scene graph description 140104. The binary assets 140102 are included in the scene graph and associated with the description 140101. In an example of FIG. 19, four binary assets 140102 are provided. The four binary assets 140102 can include a binary asset A 140102, a binary asset B 140102, a binary asset C 140102, and a binary asset D 140102. References 140103 from the description 140101 can include a reference 140103A to binary asset A, a reference 140103B to binary asset B, a reference 140103C to binary asset C, and a reference 140103D to binary asset D.

FIG. 20 provides an example of a mapping process 2000, where an ITMF OCS is mapped to IMS metadata. Thus, based on the mapped IMS metadata, a format A (e.g., ITMF) can be translated to a format B. An exemplary ITMF OCS can be shown as 2001 in FIG. 20. As shown in FIG. 20, in the ITMF OCS 2001, information related to the spatial, logical, physical, and temporal aspects of the scene graph can be associated with a unique identifier which is depicted as 'id=nnn' where 'nnn' is an integer. Standardized metadata (or IMS metadata) 2002 can be denoted as a plurality of IMS IDs (or IMS metadata IDs). For example, IMS metadata 2002 can be indicated by IMS_ID_2002A, IMS_ID_2002B, IMS_ID_2002C, IMS_ID_2002D, IMS_ID_2002E, IMS_ID_2002F, IMS_ID_2002G, IMS_ID_2002H, IMS_ID_2002I, IMS_ID_2002J, IMS_ID_2002K, and IMS_ID_2002L. Mapping 2003 in FIG. 20 shows an example of mapping the unique identifiers from the ITMF OCS to the IMS metadata identifiers. In the exemplary mapping 2003, associations (or correlations) between the identifiers of ITMF OCS and the IMS metadata identifiers can be created as follows: a scene graph id 1 of the ITMF OCS is associated with IMS_ID_2002A, a scene graph id 2 of the ITMF OCS is associated with IMS_ID_2002B, a scene graph id 3 of the ITMF OCS is associated with IMS_ID_2002C, a scene graph id 4 of the ITMF OCS is associated with IMS_ID_2002D, a scene graph id 5 of the ITMF OCS is associated with IMS_ID_2002E, a scene graph id 6 of the ITMF OCS is associated with IMS_ID_2002F, a scene graph id 7 of the ITMF OCS is associated with IMS_ID_2002G, a scene graph id 8 of the ITMF OCS is associated with IMS_ID_2002H, a scene graph id 9 of the ITMF OCS is associated with IMS_ID_2002I, a scene graph id 10 of the ITMF OCS is associated with IMS_ID_2002J, a scene graph id 11 of the ITMF OCS is associated with IMS_ID_2002K, and a scene graph id 12 of the ITMF OCS is associated with IMS_ID_2002L.

Figure 21:
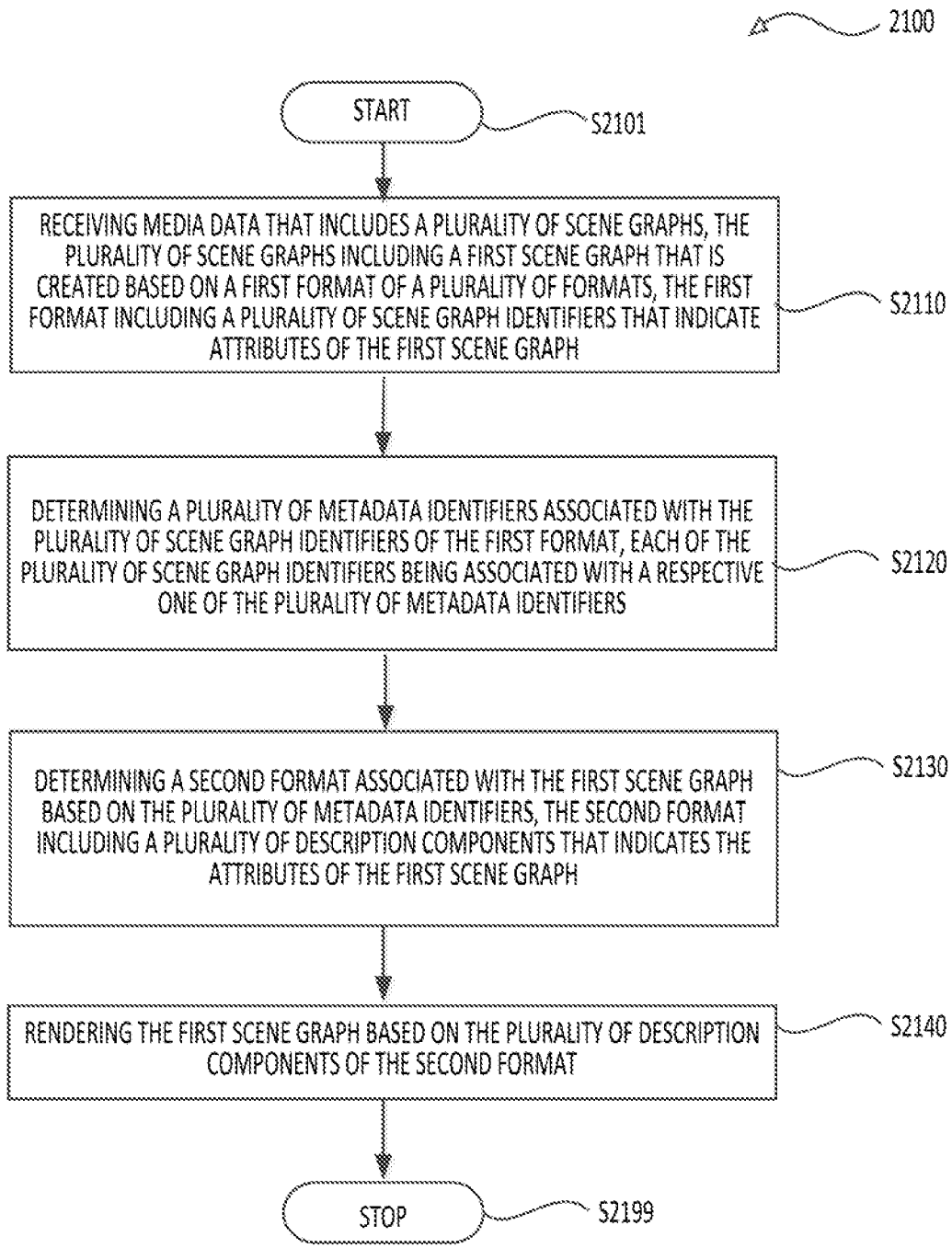
FIG. 21 shows a flow chart outlining a scene translation process according to some embodiments of the disclosure.

FIG. 21 shows a flow chart outlining a process 2100 according to an embodiment of the disclosure. The process 2100 can be executed in an electronic device, such as a client device with a smart client for interfacing the client device with a network. In some embodiments, the process 2100 is implemented in software instructions, thus when processing circuitry executes the software instructions, the processing circuitry performs the process 2100. For example, the smart client is implemented in software instructions, the software instructions can be executed by processing circuitry to perform a smart client process that can include the process 2100. The process starts at S2101, and proceeds to S2110.

At S2110, media data that includes a plurality of scene graphs is received. The plurality of scene graphs includes a first scene graph that is created based on a first format of a plurality of formats. The first format includes a plurality of scene graph identifiers that indicate attributes of the first scene graph.

At S2120, a plurality of metadata identifiers associated with the plurality of scene graph identifiers of the first format is determined. Each of the plurality of scene graph identifiers is associated with a respective one of the plurality of metadata identifiers.

At S2130, a second format associated with the first scene graph is determined based on the plurality of metadata identifiers. The second format includes a plurality of description components that indicates the attributes of the first scene graph.

At S2140, the first scene graph is rendered based on the plurality of description components of the second format.

In an example, the plurality of metadata identifiers associated with the first format is specified in ISO/IEC 28090 Part 28.

In some embodiments, the first format is an Immersive Technologies Media Format (ITMF).

In an example, the attributes of the first scene graph include at least one of a logical attribute, a physical attribute, a temporal attribute, or a spatial attribute.

In an example, each of the plurality of metadata identifiers associated with the first format indicates a respective one of the attributes of the first scene graph.

In an example, the first scene graph includes a plurality of binary assets, each of the plurality of binary assets indicating a respective element of an object included in the first scene graph.

In some embodiments, the attributes of each of the plurality of binary assets of the first scene graph are indicated by the plurality of scene graph identifiers of the first format.

In some embodiments, the attributes of each of the plurality of binary assets of the first scene graph are indicated by the plurality of description components of the second format.

In an example, the second format includes one of a Graphics Language Transmission Format (glTF), an glTF prime, and a Universal Scene Description.

In an example, each of the plurality of scene graph identifiers of the first format is a respective integer.

Then, the process 2100 proceeds to S2199 and terminates.

The process 2100 can be suitably adapted to various scenarios and steps in the process 2100 can be adjusted accordingly. One or more of the steps in the process 2100 can be adapted, omitted, repeated, and/or combined. Any suitable order can be used to implement the process 2100. Additional step(s) can be added.

According to third aspects of the disclosure, a format translation can be implemented by mapping standardized metadata, such as the metadata described in ISO/IEC 23090 Part 28, to individual components for a scene graph that is represented according to the syntax of the glTF, such as the glTF version 2.0 specified by the Khronos Group. The techniques of the disclosure can provide format translations of scene graphs, from one format to another.

Figure 22:
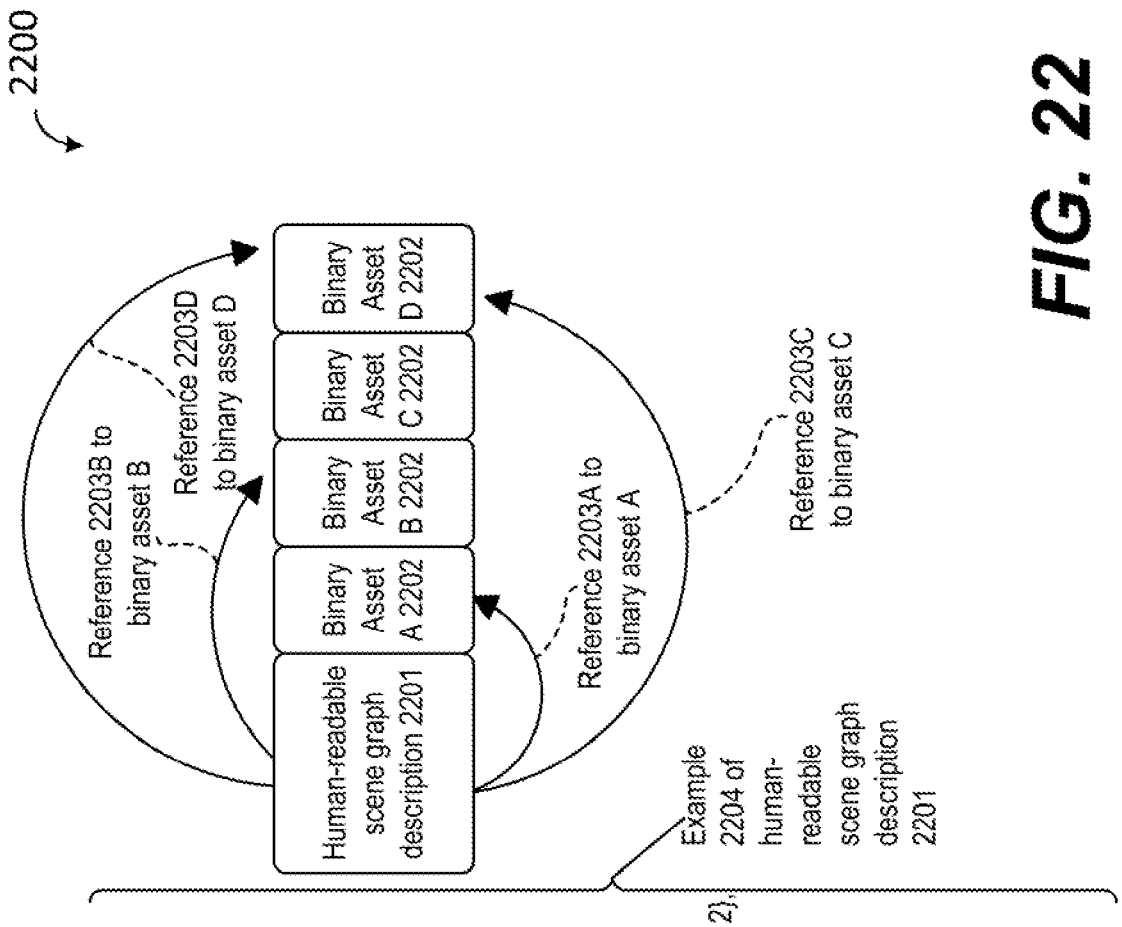
FIG. 22 is a schematic illustration of an expanded example of a scene graph architecture based on a graphics language transmission format (glTF) according to some embodiments of the disclosure.

FIG. 22 shows an expanded example 2200 of the general scene graph architecture 1400 depicted in FIG. 14 using a human-readable portion of a glTF scene graph (e.g., a scene graph is created or described based on glTF). The scene graph based on glTF can include a human-readable scene graph description (or description) 2201 and a plurality of binary assets 2202. FIG. 22 shows an example 2204 of the human-readable scene graph description 2201. The exemplary description 2204 can include the syntax of the glTF specification. The description 2201 can be a portion of the scene graph and configured to describe (or provide) spatial, logical, physical, and temporal aspects of the associated binary assets 2202. The description 2201 shown in FIG. 22 can also include references 2203 associated with the binary assets 2202. For simplicity and clarity, the binary assets 2202 are not depicted in the exemplary description 2204. Based on the reference 2203, the description 2201 can provide addresses and descriptions of the binary assets 2202. In an example of FIG. 22, four binary assets 2202 are provided: a binary asset A 2202, a binary asset B 2202, a binary asset C 2202, and a binary asset D 2202. References 2203 from the description 2201 can include a reference 2203A associated with the binary asset A, a reference 2203B associated with the binary asset B, a reference 2203C associated with the binary asset C, and a reference 2203D associated with the binary asset D.

Figure 23:
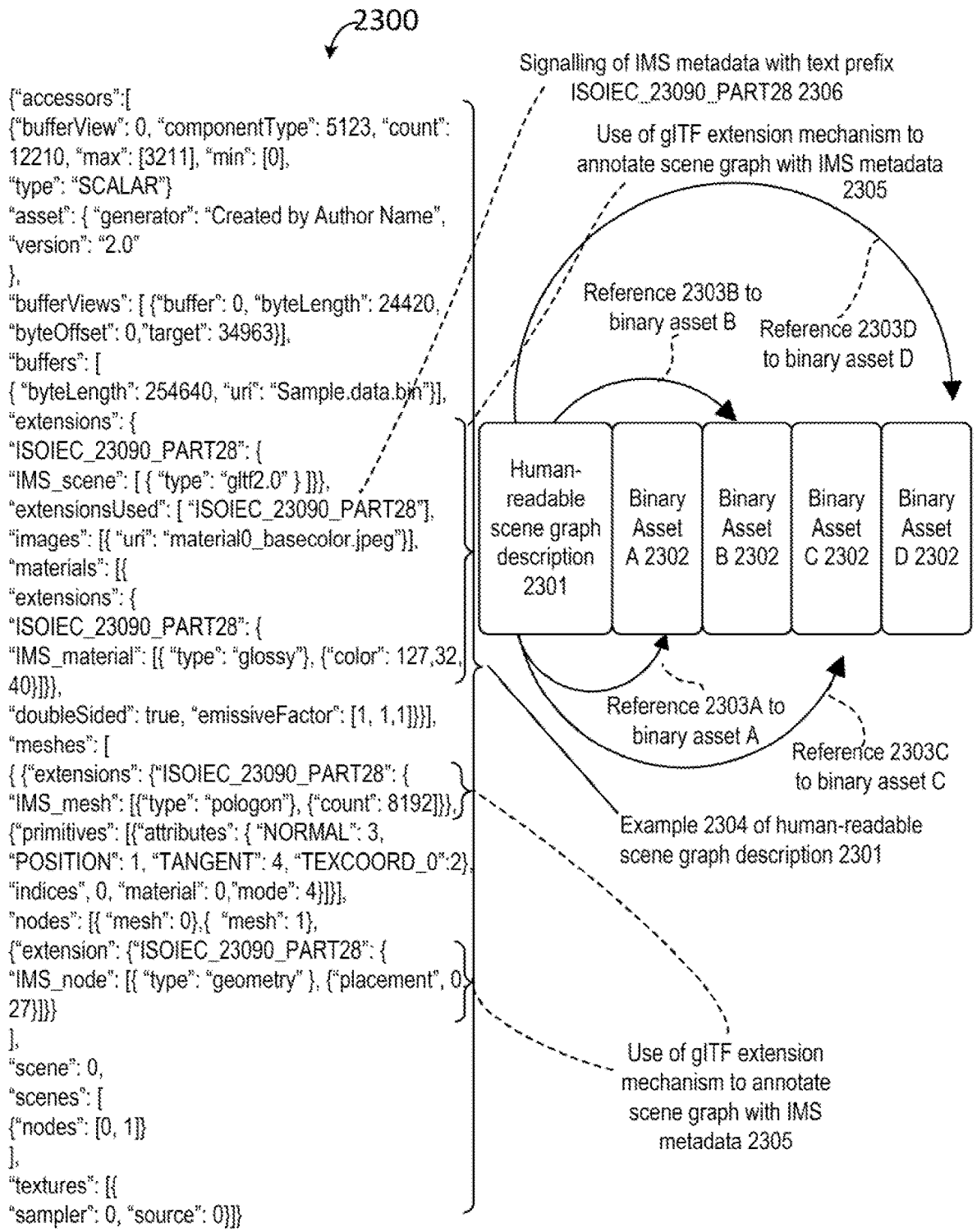
FIG. 23 is a schematic illustration of an exemplary scene graph architecture based on glTF with embedded textual annotation.

FIG. 23 shows an example architecture 2300 of utilizing extension features of the base glTF specification (e.g., glTF specification 2204) to annotate a human-readable scene graph description of the glTF, where IMS metadata can be directly embedded in the human-readable scene graph description based on the extension features. Further, based on the embedded IMS metadata, the scene graph can be translated from glTF to another format, such as ITMF and glTF prime. The human-readable scene graph description (or description) of the scene graph in glTF can be denoted as 2301 in the scene graph architecture 2300 of FIG. 23. An annotated example of the description 2301 can be expanded and denoted as 2304 in FIG. 23. The description 2301 in FIG. 23 can be an annotated version of the human-readable description 2201 in FIG. 22.

Still referring to FIG. 23, IMS metadata can be embedded in the human-readable description (or description) 2301 based on the extension feature of the glTF, where the extension feature can be indicated by a textual prefix. For example, a plurality of IMS metadata 2305 can be included in the example 2304 and indicated by a prefix "ISOIEC_23090_PART28". Thus, the scene graph can be translated from a format A (e.g., glTF) to a format B based on the embedded IMS metadata 2305. The embedded IMS metadata can further be signaled to an encoder by using the textual prefix. The encoder can identify the IMS metadata based on textual prefix. FIG. 23 shows an exemplary signal 2306 in which the IMS metadata is signaled (or notified) to the encoder using an exemplary textual prefix "ISOIEC_23090_PART28." Without the signaled prefix, the encoder may not understand the embedded IMS metadata in the glTF specification 2301. Based on the signaled prefix, the encoder can identify the extended feature of the glTF spec. The scene graph can include binary assets 2302 and the description 2301. FIG. 23 illustrates four exemplary binary assets 2302: a binary asset A 2302, a binary asset B 2302, a binary asset C 2302, and a binary asset D 2302. References 2303 from the description 2301 can provide addresses and descriptions of the binary assets 2302. For example, a reference 2303A is associated with the binary asset A, reference 2303B is associated with the binary asset B, a reference 2303C is associated with the binary asset C, and a reference 2303D is associated with the binary asset D.

According to fourth aspects of the present disclosure, IMS metadata identifiers (IDs) can be directly embedded in a human-readable scene graph description of a scene graph. The scene graph can be created or described based on glTF. Each IMS metadata ID can correspond to a respective binary metadata. The binary metadata can be included in the scene graph. Further, based on the binary metadata, the scene graph can be translated from glTF to another format.

Figure 24:
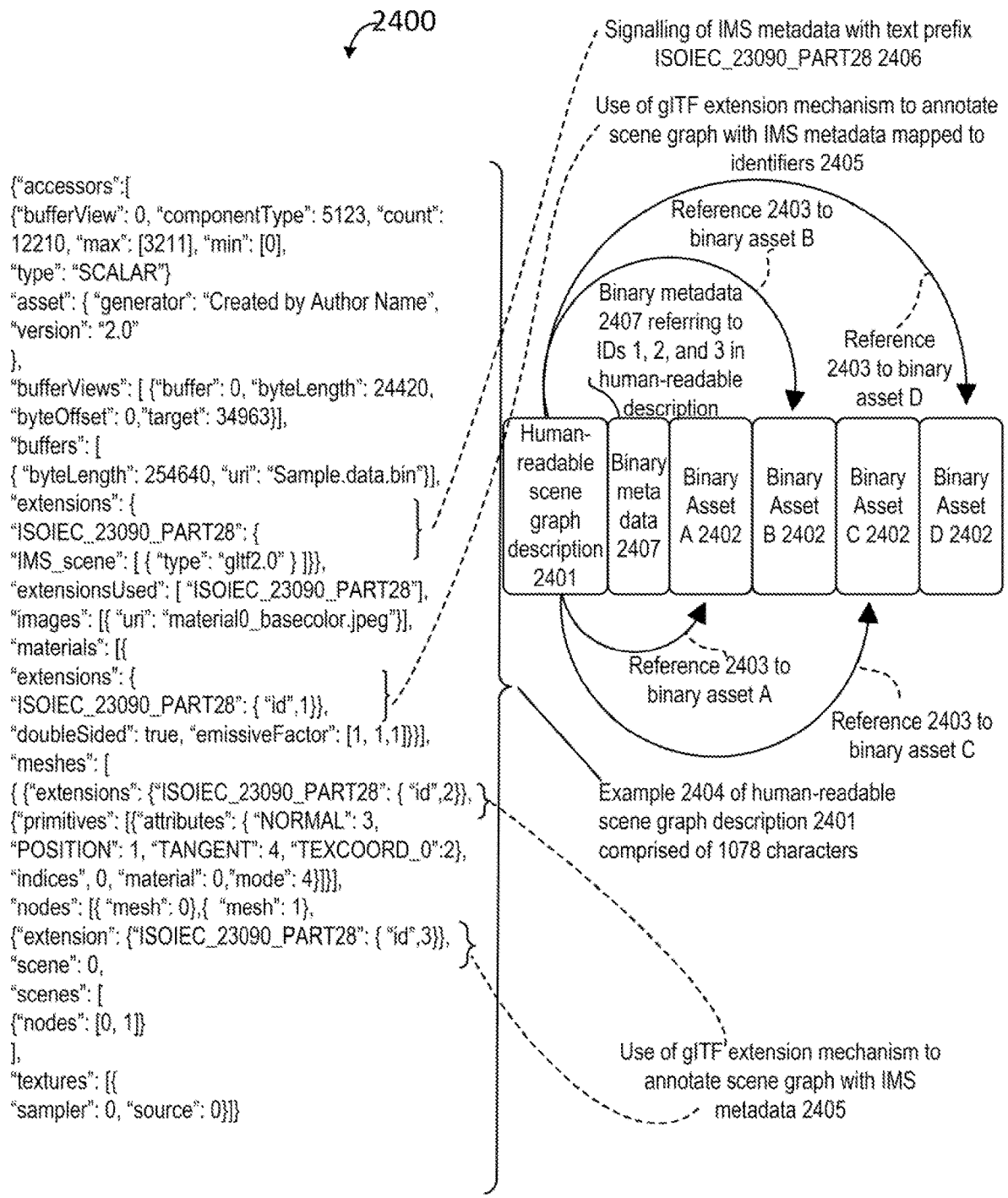
FIG. 24 is a schematic illustration of an exemplary scene graph architecture based on glTF with binary annotation.

FIG. 24 provides an example architecture 2400 of utilizing the extension features of the base glTF specification to annotate the human-readable scene graph description (or description) 2401 of the glTF, where IMS metadata 2405 can be embedded. The embedded IMS metadata 2405 can include human-readable identifiers that correspond to binary metadata included in the scene graph. As shown in FIG. 24, the scene graph can include the human-readable description 2401, one or more binary metadata 2407, and a plurality of binary assets 2402. An annotated example of the description 2401 can be expanded and depicted as 2404 in FIG. 24. In some embodiments, the description 2401 in FIG. 24 can be an annotated version of the human-readable description 2201 from FIG. 22. The IMS metadata 2405 can be embedded directly in the human-readable description 2404 and include human-readable identifiers, such as "id" 1, "id" 2, and "id" 3, to identify portions of the scene graph that are annotated with complementary binary data (or binary metadata) 2407. For example, each identifier can correspond to (or identify) a respective binary data 2407. It should be noted that FIG. 24 is merely an example. The scene graph can include one or more binary metadata 2407. The binary metadata 2407 can be stored separately from the human-readable portion (or description) 2401 of the scene graph In FIG. 24. Thus, the scene graph can be translated from a format A (e.g., glTF) to a format B based on the binary metadata 2407.

Still referring to FIG. 24, an exemplary signal 2406 is included in the human-readable description 2401. The signal 2406 can provide the IMS metadata 2405 to the encoder using a textual prefix, such as a textual prefix "ISOIEC_23090_PART28." FIG. 24 shows four exemplary binary assets 2402 that are associated with the description 2401. The binary assets 2402 can include a binary asset A 2402, a binary asset B 2402, a binary asset C 2402, and a binary asset D 2402. References 2403 from the description 2401 can provide addresses and descriptions of the binary assets 2402. For example, a reference 2403A is associated with the binary asset A, a reference 2403B is associated with the binary asset B, a reference 2403C is associated with the binary asset C, and a reference 2403D is associated with the binary asset D.

In the embodiment shown in FIG. 23, IMS metadata 2305 is embedded in a format in which the IMS metadata cannot be provided in a binary format, such as the glTF specification 2301. In the embodiment shown in FIG. 24, IMS metadata can include IMS metadata 2405 and the binary metadata 2407. The IMS metadata 2405 can include IMS metadata IDs embedded in the glTF specification 2401 and the binary metadata 2407 can be included in the scene graph in the binary format. The binary metadata can further be referred by using the IMS metadata IDs. Thus, a size of the glTF specification 2401 can be reduced. For example, the IMS metadata 2405 shown in FIG. 24 includes 1078 human-readable characters, while the IMS metadata 2305 in FIG. 23 includes 1178 human-readable characters.

Figure 25:
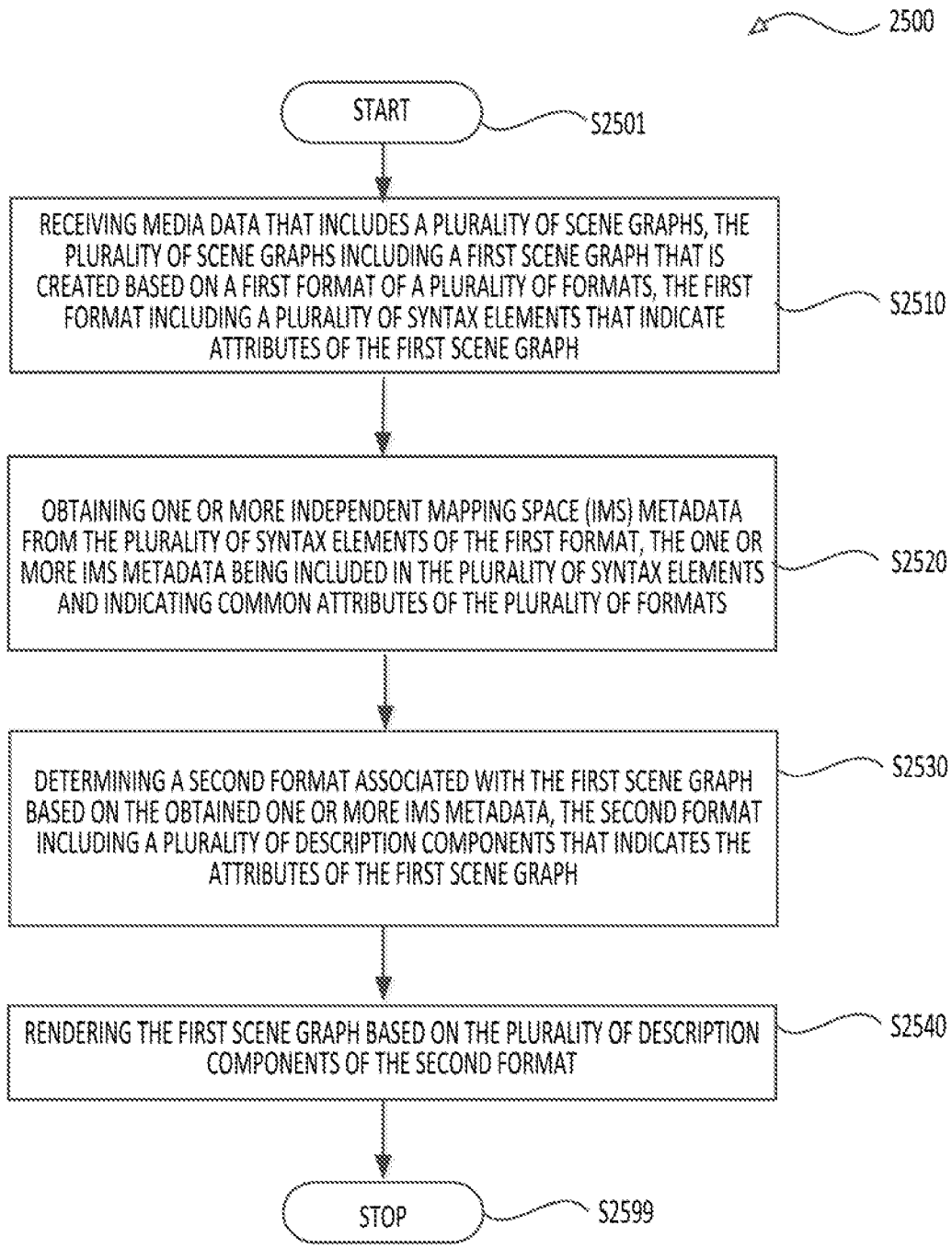
FIG. 25 shows a flow chart outlining a scene translation process according to some embodiments of the disclosure.

FIG. 25 shows a flow chart outlining a process 2500 according to an embodiment of the disclosure. The process 2500 can be executed in an electronic device, such as a client device with a smart client for interfacing the client device with a network. In some embodiments, the process 2500 is implemented in software instructions, thus when processing circuitry executes the software instructions, the processing circuitry performs the process 2500. For example, the smart client is implemented in software instructions, the software instructions can be executed by processing circuitry to perform a smart client process that can include the process 2500. The process starts at S2501, and proceeds to S2510.

At S2510, media data that includes a plurality of scene graphs is received. The plurality of scene graphs includes a first scene graph that is created based on a first format of a plurality of formats. The first format includes a plurality of syntax elements that indicate attributes of the first scene graph.

At S2520, one or more independent mapping space (IMS) metadata are obtained from the plurality of syntax elements of the first format. The one or more IMS metadata are included in the plurality of syntax elements and indicates common attributes of the plurality of formats.

At S2530, a second format associated with the first scene graph is determined based on the obtained one or more IMS metadata. The second format includes a plurality of description components that indicates the attributes of the first scene graph.

At S2540, the first scene graph is rendered based on the plurality of description components of the second format.

In some embodiments, the one or more IMS metadata are specified in ISO/IEC 28090 Part 28.

In an example, the first format is a Graphics Language Transmission Format (glTF).

In an example, the one or more IMS metadata are included in the plurality of syntax elements of the first format and identified based on a prefix of an extension feature of the first format.

In some embodiments, the attributes of the first scene graph include at least one of a logical attribute, a physical attribute, a temporal attribute, or a spatial attribute.

In some embodiments, the first scene graph includes a plurality of binary assets, where each of the plurality of binary assets indicates a respective element of an object included in the first scene graph.

In an example, the first scene graph includes one or more binary metadata.

In an example, each of the one or more IMS metadata includes a respective metadata identifier associated with one of the common attributes of the plurality of formats. Each of the metadata identifiers of the one or more IMS metadata is an integer and corresponds to a respective binary metadata of the one or more binary metadata.

In some embodiment, the attributes of each of the plurality of binary assets of the first scene graph are indicated by the plurality of syntax elements of the first format.

In some embodiments, the attributes of each of the plurality of binary assets of the first scene graph are indicated by the plurality of description components of the second format.

In an example, the second format includes one of an Immersive Technologies Media Format (ITMF) and a Universal Scene Description.

Then, the process 2500 proceeds to S2599 and terminates.

The process 2500 can be suitably adapted to various scenarios and steps in the process 2500 can be adjusted accordingly. One or more of the steps in the process 2500 can be adapted, omitted, repeated, and/or combined. Any suitable order can be used to implement the process 2500. Additional step(s) can be added.

The use of "at least one of" or "one of" in the disclosure is intended to include any one or a combination of the recited elements. For example, references to at least one of A, B, or C; at least one of A, B, and C; at least one of A, B, and/or C; and at least one of A to C are intended to include only A, only B, only C or any combination thereof. References to one of A or B and one of A and B are intended to include A or B or (A and B). The use of "one of" does not preclude any combination of the recited elements when applicable, such as when the elements are not mutually exclusive.

While this disclosure has described several exemplary embodiments, there are alterations, permutations, and various substitute equivalents, which fall within the scope of the disclosure. It will thus be appreciated that those skilled in the art will be able to devise numerous systems and methods which, although not explicitly shown or described herein, embody the principles of the disclosure and are thus within the spirit and scope thereof.

What is claimed is:

1. A method of media processing in an electronic device, comprising:
receiving media data that includes a plurality of scene graphs, the plurality of scene graphs including a first scene graph that is created based on a first scene graph format of a plurality of scene graph formats that comprise attributes of the plurality of scene graphs, the first scene graph format including a plurality of description components that indicates attributes of the first scene graph;
determining (i) a plurality of metadata identifiers associated with the first scene graph format, and (ii) a plurality of metadata identifiers associated with a second scene graph format of the plurality of scene graph formats based on an independent mapping space (IMS) lookup table, the IMS lookup table identifying metadata identifiers associated with each of the plurality of scene graph formats;
determining a plurality of description components of the second scene graph format that indicates the attributes of the first scene graph based on (i) the plurality of description components of the first scene graph format, (ii) the plurality of metadata identifiers associated with the first scene graph format, and (iii) the plurality of metadata identifiers associated with the second scene graph format; and
rendering the first scene graph based on the plurality of description components of the second scene graph format.

2. The method of claim 1, wherein the attributes of the first scene graph include at least one of a logical attribute, a physical attribute, a temporal attribute, or a spatial attribute.

3. The method of claim 2, wherein each of the plurality of description components of the first scene graph format indicates a respective one of the attributes of the first scene graph.

4. The method of claim 1, wherein:
each of the plurality of description components of the first scene graph format is associated with one or more metadata identifiers of the plurality of metadata identifiers that are associated with the first scene graph format, and
each of the plurality of description components of the second scene graph format is associated with one or more metadata identifiers of the plurality of metadata identifiers that are associated with the second scene graph format.

5. The method of claim 1, wherein:
the first scene graph format is one of a Graphics Language Transmission Format (glTF), a glTF prime, an Immersive Technologies Media Format (ITMF), a Universal Scene Description, and a first renderer, and
the second scene graph format is one of the glTF, the glTF prime, the ITMF, the Universal Scene Description, and a second renderer, the second scene graph format being different from the first scene graph format.

6. The method of claim 1, wherein the plurality of metadata identifiers associated with the first scene graph format is specified in ISO/IEC 28090 Part 28.

7. The method of claim 1, wherein the first scene graph includes a plurality of binary assets, each of the plurality of binary assets indicating a respective element of an object included in the first scene graph.

8. The method of claim 7, wherein the attributes of each of the plurality of binary assets of the first scene graph are indicated by the plurality of description components of the first scene graph format.

9. The method of claim 7, wherein the attributes of each of the plurality of binary assets of the first scene graph are indicated by the plurality of description components of the second scene graph format.

10. The method of claim 1, wherein a first description component and a second description component of the plurality of description components of the first scene graph format are associated with a same metadata identifier of the plurality of metadata identifiers associated with the first scene graph format.

11. An apparatus for media processing, the apparatus comprising:
processing circuitry configured to:
receive media data that includes a plurality of scene graphs, the plurality of scene graphs including a first scene graph that is created based on a first scene graph format of a plurality of scene graph formats that comprise attributes of the plurality of scene graphs, the first scene graph format including a plurality of description components that indicates attributes of the first scene graph;
determine (i) a plurality of metadata identifiers associated with the first scene graph format, and (ii) a plurality of metadata identifiers associated with a second scene graph format of the plurality of scene graph formats based on an independent mapping space (IMS) lookup table, the IMS lookup table identifying metadata identifiers associated with each of the plurality of scene graph formats;
determine a plurality of description components of the second scene graph format that indicates the attributes of the first scene graph based on (i) the plurality of description components of the first scene graph format, (ii) the plurality of metadata identifiers associated with the first scene graph format, and (iii) the plurality of metadata identifiers associated with the second scene graph format; and
render the first scene graph based on the plurality of description components of the second scene graph format.

12. The apparatus of claim 11, wherein the attributes of the first scene graph include at least one of a logical attribute, a physical attribute, a temporal attribute, or a spatial attribute.

13. The apparatus of claim 12, wherein each of the plurality of description components of the first scene graph format indicates a respective one of the attributes of the first scene graph.

14. The apparatus of claim 11, wherein:
each of the plurality of description components of the first scene graph format is associated with one or more metadata identifiers of the plurality of metadata identifiers that are associated with the first scene graph format, and
each of the plurality of description components of the second scene graph format is associated with one or more metadata identifiers of the plurality of metadata identifiers that are associated with the second scene graph format.

15. The apparatus of claim 11, wherein:
the first scene graph format is one of a Graphics Language Transmission Format (glTF), a glTF prime, an Immersive Technologies Media Format (ITMF), a Universal Scene Description, and a first renderer, and
the second scene graph format is one of the glTF, the glTF prime, the ITMF, the Universal Scene Description, and a second renderer, the second scene graph format being different from the first scene graph format.

16. The apparatus of claim 11, wherein the plurality of metadata identifiers associated with the first scene graph format is specified in ISO/IEC 28090 Part 28.

17. The apparatus of claim 11, wherein the first scene graph includes a plurality of binary assets, each of the plurality of binary assets indicating a respective element of an object included in the first scene graph.

18. The apparatus of claim 17, wherein the attributes of each of the plurality of binary assets of the first scene graph are indicated by the plurality of description components of the first scene graph format.

19. The apparatus of claim 17, wherein the attributes of each of the plurality of binary assets of the first scene graph are indicated by the plurality of description components of the second scene graph format.

20. The apparatus of claim 11, wherein a first description component and a second description component of the plurality of description components of the first scene graph format are associated with a same metadata identifier of the plurality of metadata identifiers associated with the first scene graph format.

* * * * *